United States Patent
Miyazaki et al.

(10) Patent No.: US 12,210,232 B2
(45) Date of Patent: Jan. 28, 2025

(54) OPTICAL MODULATOR AND OPTICAL TRANSMISSION APPARATUS USING SAME

(71) Applicant: SUMITOMO OSAKA CEMENT CO., LTD., Tokyo (JP)

(72) Inventors: Norikazu Miyazaki, Tokyo (JP); Toru Sugamata, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 421 days.

(21) Appl. No.: 17/619,824

(22) PCT Filed: Jun. 18, 2020

(86) PCT No.: PCT/JP2020/023969
§ 371 (c)(1),
(2) Date: Dec. 16, 2021

(87) PCT Pub. No.: WO2020/256065
PCT Pub. Date: Dec. 24, 2020

(65) Prior Publication Data
US 2022/0357605 A1  Nov. 10, 2022

(30) Foreign Application Priority Data
Jun. 18, 2019  (JP) ................................ 2019-112845

(51) Int. Cl.
*G02F 1/225* (2006.01)
*G02F 1/035* (2006.01)

(52) U.S. Cl.
CPC .......... *G02F 1/0356* (2013.01); *G02F 1/2255* (2013.01); *G02F 2201/127* (2013.01)

(58) Field of Classification Search
CPC . G02F 1/0356; G02F 1/2255; G02F 2201/127
(Continued)

(56) References Cited

U.S. PATENT DOCUMENTS

| | | | |
|---|---|---|---|
| 9,316,887 B2* | 4/2016 | Sugiyama | H04B 10/532 |
| 2003/0151792 A1* | 8/2003 | Kaitoh | G02F 1/0305 |
| | | | 359/279 |

(Continued)

FOREIGN PATENT DOCUMENTS

| | | |
|---|---|---|
| JP | 2010-185979 | 8/2010 |
| JP | 2018-106091 | 7/2018 |
| JP | 2019-045592 | 3/2019 |

OTHER PUBLICATIONS

"Electronic-Photonic Integrated Circuit Design and Crosstalk Modeling for a High Density Multi-Lane MZM Array" by Ji et al., IEEE International Symposium on Circuits and Systems, pp. 1-5 (Year: 2018).*

(Continued)

*Primary Examiner* — Robert Tavlykaev
(74) *Attorney, Agent, or Firm* — Rankin, Hill & Clark LLP

(57) ABSTRACT

An optical modulator includes a relay substrate having signal conductor patterns that connect input signal terminals and signal electrodes of an optical modulation element and ground conductor patterns, and a housing that accommodates the optical modulation element and the relay substrate. Regarding at least one signal conductor pattern, the two ground conductor patterns sandwiching the signal conductor pattern are formed in an asymmetrical shape in a plan view in a rectangular connection area including a signal connection portion at which the signal conductor pattern and the input signal terminal are connected. The connection area is centered on the at least one signal conductor pattern in a width direction, and has a width equal to a distance to the nearest adjacent signal conductor pattern and a height equal to a distance from an end of the signal connection portion farthest from a signal input side to the signal input side.

10 Claims, 15 Drawing Sheets

(58) Field of Classification Search
USPC .......................................................... 385/1–3
See application file for complete search history.

(56) References Cited

U.S. PATENT DOCUMENTS

| | | | | |
|---|---|---|---|---|
| 2010/0202723 | A1* | 8/2010 | Sugiyama | G02F 1/2255 |
| | | | | 385/2 |
| 2011/0157673 | A1* | 6/2011 | Mitomi | G02F 1/2255 |
| | | | | 359/279 |
| 2015/0261062 | A1* | 9/2015 | Sugiyama | G02B 6/12 |
| | | | | 385/14 |
| 2016/0033848 | A1* | 2/2016 | Kataoka | G02F 1/2255 |
| | | | | 385/3 |
| 2016/0054637 | A1* | 2/2016 | Kataoka | G02F 1/2255 |
| | | | | 385/2 |
| 2016/0291351 | A1* | 10/2016 | Kataoka | G02F 1/0356 |
| 2018/0059503 | A1* | 3/2018 | Miyazaki | H04B 10/505 |
| 2018/0231866 | A1* | 8/2018 | Sugamata | G02F 1/2255 |
| 2018/0373066 | A1* | 12/2018 | Miyazaki | G02F 1/0121 |

OTHER PUBLICATIONS

International Search Report, Date of mailing: Sep. 15, 2021, 2 pages.

* cited by examiner

DETAILED VIEW OF PART A

OPTICAL MODULATOR AND OPTICAL TRANSMISSION APPARATUS USING SAME

TECHNICAL FIELD

The present invention relates to an optical modulator including a relay substrate that relays propagation of an electrical signal between a input signal terminal and a signal electrode of an optical modulation element, and an optical transmission apparatus using the optical modulator.

BACKGROUND ART

In a high-speed/large-capacity optical fiber communication system, an optical modulator incorporating a waveguide type optical modulation element is often used. Among them, an optical modulation element using $LiNbO_3$ (hereinafter, also referred to as LN) having an electro-optic effect for a substrate can realize high-bandwidth optical modulation characteristics with a small light loss, so the optical modulation element is widely used in high-speed/large-capacity optical fiber communication systems.

The optical modulation element using the LN substrate includes Mach-Zehnder type optical waveguides and signal electrodes for applying a high-frequency electrical signal as a modulation signal to the optical waveguides. Then, the signal electrodes provided in the optical modulation element are connected to lead pins and connectors that are input signal terminals provided on a housing, via a relay substrate provided in the housing of the optical modulator that accommodates the optical modulation element. Thus, since the lead pins and connectors that are input signal terminals are connected to a circuit substrate on which an electronic circuit for causing the optical modulator to perform a modulation operation is mounted, an electrical signal output from the electronic circuit is applied to the signal electrodes of the optical modulation element via the relay substrate.

Due to the increasing transmission capacity in recent years, the main stream of modulation methods in optical fiber communication systems is multi-level modulation and the transmission format adopting polarized wave multiplexing for multi-level modulation, such as Quadrature Phase Shift Keying (QPSK) and Dual Polarization-Quadrature Phase Shift Keying (DP-QPSK), which are used in fundamental optical transmission networks and is also being introduced into metro networks.

An optical modulator that performs QPSK modulation (QPSK optical modulator) and an optical modulator that performs DP-QPSK modulation (DP-QPSK optical modulator) include a plurality of Mach-Zehnder optical waveguides having a so-called nested structure called a nested type, each of which has at least one signal electrode. Therefore, the optical modulators are provided with a plurality of signal electrodes, and the above-described DP-QPSK modulation operation is performed in cooperation with high-frequency electrical signals applied to the signal electrodes.

FIG. 15 is a plan view illustrating an example of a configuration of an optical modulator including such a relay substrate in the related art. An optical modulator 2200 includes, for example, an optical modulation element 2202 which is a DP-QPSK modulator formed on an LN substrate, and a housing 2204 that accommodates the optical modulation element 2202. Here, the housing 2204 is configured with a case 2214a and a cover 2214b. The optical modulator 2200 also includes an input optical fiber 2208 and an output optical fiber 2210 which are fixed to the case 2214a and perform an input and output of light to the optical modulation element 2202.

Four input signal terminals 2224a, 2224b, 2224c, and 2224d (hereinafter, collectively also referred to as a input signal terminal 2224) for inputting a high-frequency electrical signal for driving the optical modulation element 2202 from an external electronic circuit are further provided, in the case 2214a of the housing 2204. Specifically, the input signal terminal 2224 is, for example, a center electrode of electrical connectors 2216a, 2216b, 2216c, and 2216d (hereinafter, collectively also referred to as an electrical connector 2216) which are high-frequency coaxial connectors. The high-frequency electrical signals input from the respective input signal terminals 2224 are input to one ends of the four signal electrodes 2212a, 2212b, 2212c, and 2212d (hereinafter, collectively also referred to as a signal electrode 2212) provided in the optical modulation element 2202 via a relay substrate 2218 accommodated in the housing 2204, and terminated by a terminator 2220 with a predetermined impedance provided at the other end of the signal electrode 2212.

The optical modulation element 2202 outputs two modulated light beams from two output optical waveguides 2226a and 2226b, and the two output light beams are combined into one beam by a polarization-combining part 2228 including a polarization-combining prism or the like. The combined light is output to an outside of the housing 2204 via the output optical fiber 2210.

In such an optical modulator 2200 in which high-frequency electrical signals respectively given to a plurality of signal electrodes 2212 cooperate to perform modulation, all the high-frequency electrical signals are desirable to be input to the signal electrode 2212 of the optical modulation element 2202 without being affected by noise or the like. On the other hand, the demand for miniaturization of the optical modulator 2200 remains unchanged, and the relay substrate 2218 is being miniaturized along with the miniaturization of the housing 2204 of the optical modulator 2200. As a result, a plurality of different high-frequency signals propagated in close proximity to each other in the narrow relay substrate 2218, and electrical crosstalk between the high-frequency signal lines formed on the relay substrate 2218 cannot be ignored.

In addition, commercial DP-QPSK modulators are often used at a transmission rate of 100 Gb/s at present, and development to expand this transmission rate to 400 Gb/s is also in progress. In general, radiation during transmission of high-frequency signals tends to increase as the transmission rate is increased. Therefore, if the transmission rate is increased in the future, the problem of crosstalk between high-frequency signal lines that occurs in the relay substrate can become a more serious problem.

As a method of suppressing the crosstalk, it is conceivable to increase a distance between adjacent high-frequency signal lines, but this method violates the above-described demand for miniaturization of the optical modulator, and it is difficult to adopt the method. Therefore, for example, by providing vias on ground electrodes provided between the high-frequency signal lines and connecting the vias to a ground layer on aback surface of the relay substrate, the ground electrodes are strengthened to improve a shielding effect between the high-frequency signal lines.

However, for example, in a DP-QPSK modulator having a high transmission rate of 400 Gb/s or higher, crosstalk between adjacent high-frequency signal lines may not be sufficiently suppressed only by the vias as described above.

At the high transmission rate of 400 Gb/s or higher as described above, among leaked microwaves generated from a connection point between the input signal terminal to which the high-frequency signal is input and a conductor pattern of the relay substrate and its vicinity, in addition to leaked microwaves (substrate leaked microwaves) propagating in the relay substrate 2218, leaked microwaves (space leaked microwaves) radiated from the relay substrate 2218 and propagating in a space can also be a factor of the crosstalk.

FIG. 16 is an explanatory diagram for explaining a generation and propagation of such leaked microwaves. Here, FIG. 16 illustrates the relay substrate 2218 and its periphery in the optical modulator 2200 illustrated in FIG. 15. Ground electrodes 2222a, 2222b, 2222c, 2222d, and 2222e are provided in the optical modulation element 2202 so that each of the signal electrodes 2212 constitutes a coplanar waveguide (CPW).

Further, on the relay substrate 2218, the signal conductor pattern 2230a, 2230b, 2230c, and 2230d (hereinafter, collectively also referred to as a signal conductor pattern 2230) respectively connecting the four input signal terminals 2224 and the four signal electrodes 2212 of the optical modulation element 2202 are formed. These signal conductor patterns 2230 form a high-frequency signal line together with ground conductor patterns 2240a, 2240b, 2240c, 2240d, and 2240e arranged on the relay substrate 2218 so as to sandwich the signal conductor pattern 2230 in a substrate surface direction.

In the relay substrate 2218 illustrated in FIG. 16, the high-frequency signal line including the signal conductor pattern 2230 and the ground conductor pattern 2240 is generally a coplanar waveguide, and a propagation mode of the high-frequency signal propagating through the line is a coplanar mode (hereinafter, referred to as "CPW mode"). On the other hand, the input signal terminal 2224 is generally configured with, for example, a coaxial connector, a lead pin, or the like as described above, and the propagation mode of a high-frequency signal until an input to the relay substrate 2218 is a coaxial mode.

Therefore, in four signal connection portions at which the four input signal terminals 2224 and the four signal conductor patterns 2230 of the relay substrate 2218 are respectively connected, mode conversion (that is, heterogeneous mode conversion) is performed from the coaxial mode to the CPW mode. As a result, in the signal connection portion, a part of energy of the high-frequency signal propagated in the coaxial mode is easily converted into a radiation mode, and leaked microwaves are easily generated.

That is, each of the above-described signal connection portions functions as a point wave source of the leaked microwave as an approximate simple model, and the leaked microwave is emitted as a spherical wave 2290 from each signal connection portion, and becomes substrate leaked microwaves propagating inside the relay substrate 2218 and space leaked microwaves radiated from the relay substrate 2218 and propagating in a space, for example.

Then, crosstalk may occur between the four high-frequency electrical signals input by the four input signal terminals 2224 via such substrate leaked microwaves and space leaked microwaves. Such crosstalk due to leaked microwaves is particularly likely to occur between adjacent signal conductor patterns.

That is, in an optical modulator in the related art, it is required to reduce the crosstalk between high-frequency electrical signals via the leaked microwaves and to realize appropriate modulation characteristics.

In the related art, in order to suppress high-frequency reflection, radiation, and/or leakage at the relay substrate as described above, the impedance at a connection portion between the conductor pattern of the relay substrate and the lead pin is matched with higher accuracy to the impedance of a high-frequency transmission channel formed by each of the conductor pattern and lead pin (for example, see Patent Literature No. 1).

However, the technology in the related art is effective at a transmission rate of 100 Gb/s, but does not provide an effective solution for controlling modulation characteristics deterioration due to crosstalk between adjacent signal conductor patterns via leaked microwaves, for example at a transmission rate of 400 Gb/s or higher.

CITATION LIST

Patent Literature

[Patent Literature No. 1] Japanese Laid-open Patent Publication No. 2018-106091

SUMMARY OF INVENTION

Technical Problem

From the above background, in an optical modulator including a relay substrate that electrically connects each of signal electrodes of an optical modulation element and each of input signal terminals, it is required to effectively suppress the influence of leaked microwaves that may be generated from a signal connection portion between the relay substrate and the input signal terminal, and to realize appropriate optical modulation characteristics.

Solution to Problem

According to one aspect of the present invention, there is provided an optical modulator including: an optical modulation element that includes a plurality of signal electrodes; a plurality of input signal terminals each of which inputs an electrical signal to be applied to each of the signal electrodes; a relay substrate on which a plurality of signal conductor patterns that electrically connect the input signal terminals to the signal electrodes, and a plurality of ground conductor patterns are formed; and a housing that accommodates the optical modulation element and the relay substrate, in which regarding at least one signal conductor pattern, two ground conductor patterns sandwiching the signal conductor pattern on the relay substrate are formed in an asymmetrical shape with respect to the at least one signal conductor pattern in a plan view, in a rectangular connection area in the plan view including a signal connection portion at which the signal conductor pattern and the input signal terminal are connected, the connection area is defined as a rectangle extending in a plane of the relay substrate, by setting a part of a signal input side on a side at which the at least one signal conductor pattern is connected to the input signal terminal among sides of the relay substrate as one side in a width direction, the connection area is centered on the at least one signal conductor pattern in the width direction, a width of the connection area is equal to a distance from the at least one signal conductor pattern to a nearest adjacent signal conductor pattern, and a height of the connection area is equal to a distance from the signal input side to a farthest end of the signal connection portion from the signal input side.

According to another aspect of the present invention, the two ground conductor patterns are formed to have portions in which distances from respective edges of the two ground conductor patterns to opposite edges of the at least one signal conductor pattern are different from each other in the connection area.

According to still another aspect of the present invention, widths of portions formed in the connection area of the two ground conductor patterns, measured in a direction orthogonal to an extending direction of the at least one signal conductor pattern are different from each other.

According to still another aspect of the present invention, one of the two ground conductor patterns does not include a portion formed in the connection area.

According to still another aspect of the present invention, the relay substrate is provided with a notched portion extending from the signal input side and penetrating the relay substrate in a thickness direction at a portion of the connection area at which one of the two ground conductor patterns is formed.

According to still another aspect of the present invention, there is provided an optical modulator including: an optical modulation element that includes a plurality of signal electrodes; a plurality of input signal terminals each of which inputs an electrical signal to be applied to each of the signal electrodes; a relay substrate on which a plurality of signal conductor patterns that electrically connect the input signal terminals to the signal electrodes, and a plurality of ground conductor patterns are formed; and a housing that accommodates the optical modulation element and the relay substrate, in which on the relay substrate, a rear surface ground conductor is formed on a surface facing a surface on which the ground conductor pattern is formed, regarding at least one signal conductor pattern, two ground conductor patterns sandwiching the signal conductor pattern on the relay substrate are formed in an asymmetrical shape in a connection area including a signal connection portion at which the signal conductor pattern and the input signal terminal are connected, by setting a presence or absence of vias, or the numbers or diameters of formed vias to be different from each other, the connection area is defined as a rectangle extending in a plane of the relay substrate, by setting a part of a signal input side on a side at which the at least one signal conductor pattern is connected to the input signal terminal among sides of the relay substrate as one side in a width direction, the connection area is centered on the at least one signal conductor pattern in the width direction, a width of the connection area is equal to a distance from the at least one signal conductor pattern to a nearest adjacent signal conductor pattern, and a height of the connection area is equal to a distance from the signal input side to a farthest end of the signal connection portion from the signal input side.

According to still another aspect of the present invention, the optical modulation element is configured to generate two modulated light beams, each of which is modulated by a pair of the electrical signals, and the relay substrate is configured to propagate the pair of electrical signals by a pair of the signal conductor patterns adjacent to each other.

According to still another aspect of the present invention, there is provided an optical transmission apparatus including any one of the optical modulators described above and an electronic circuit that outputs an electrical signal for causing the optical modulator to perform a modulation operation.

This application claims the benefit of Japanese Patent Application No. 2019-112845 filed on Jun. 18, 2019, the disclosure of which is herein incorporated by reference in its entirety.

Advantageous Effects of Invention

According to the present invention, in an optical modulator including a relay substrate, an influence of leaked microwaves that may be generated from a signal connection portion between the relay substrate and a input signal terminal can be effectively suppressed to realize appropriate optical modulation characteristics.

DESCRIPTION OF EMBODIMENTS

In the following embodiments and modification examples thereof, in order to solve the above-described problems, in an optical modulator including an optical modulation element and a relay substrate, in the vicinity of a connection portion at which a signal conductor pattern on the relay substrate is connected to a high-frequency input terminal, two ground conductor patterns sandwiching at least one signal conductor pattern are configured to include asymmetrically shaped portions sandwiching the signal conductor pattern, or are configured so that impedances to ground lines are different from each other, or/and the relay substrate between the adjacent signal conductor patterns is provided with a notch extending from a side of the relay substrate. Thus, in the optical modulator, intensities of space leaked microwaves and/or substrate leaked microwaves toward the adjacent signal conductor pattern are reduced, and crosstalk between the adjacent signal conductor patterns is reduced.

Hereinafter, embodiments of the present invention will be described with reference to the drawings.

First Embodiment

Figure 1:
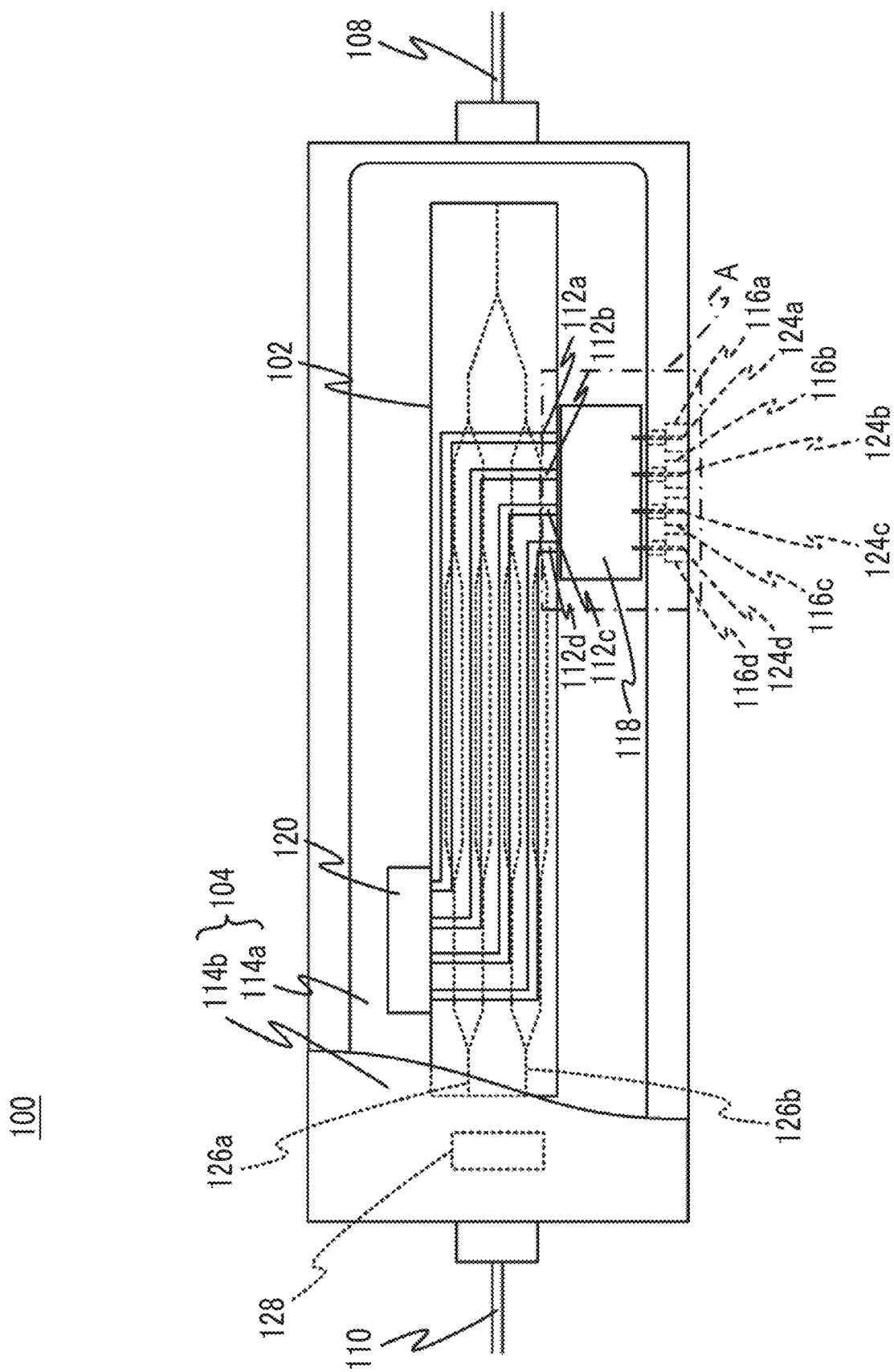
FIG. 1 is a plan view of an optical modulator according to a first embodiment of the present invention.
Figure 2:
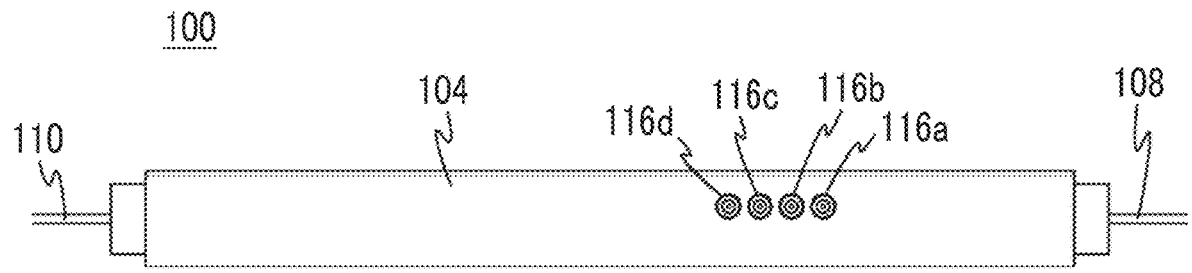
FIG. 2 is a side view of the optical modulator illustrated in FIG. 1.
Figure 3:
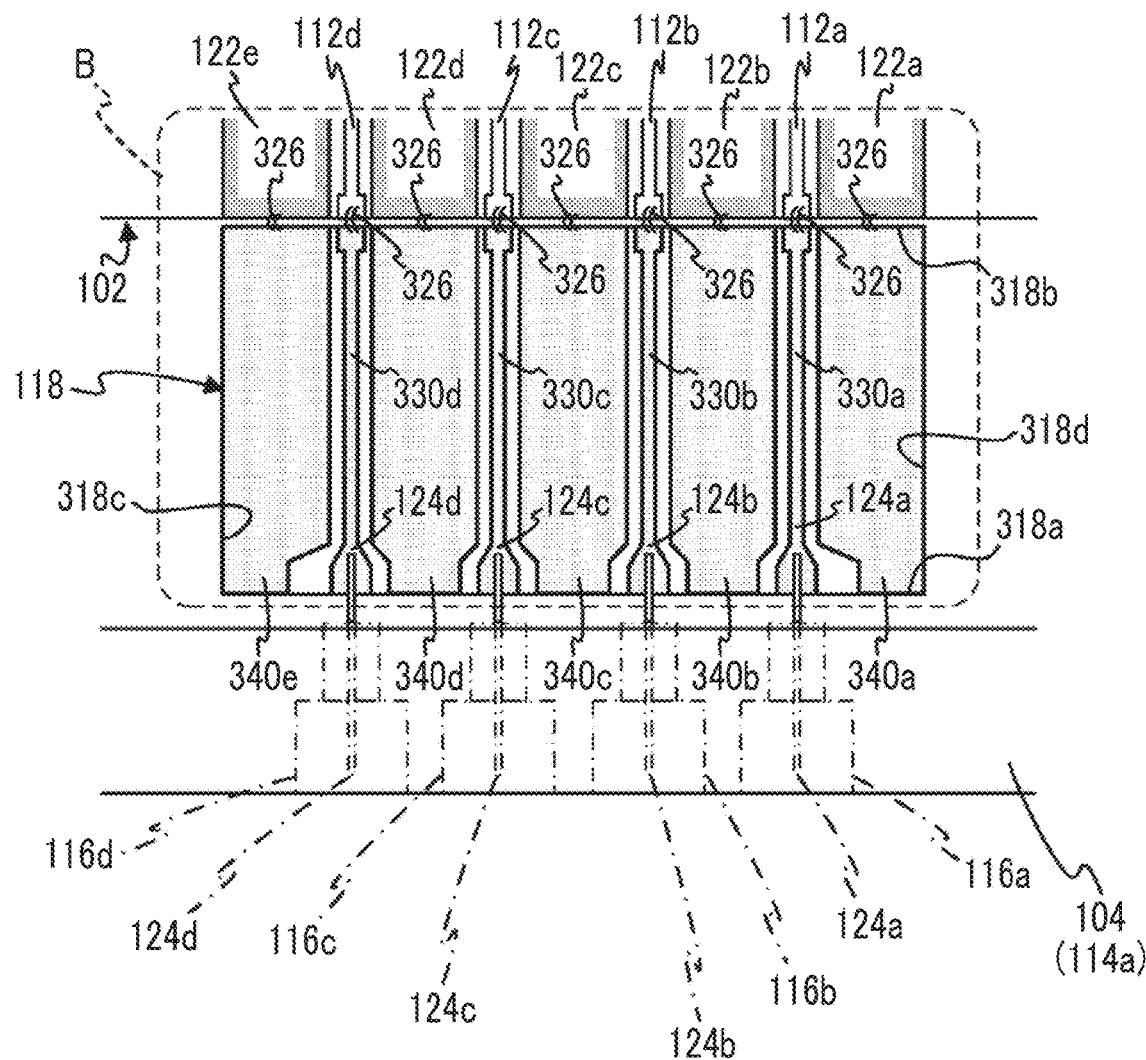
FIG. 3 is a detailed view of a part A of the optical modulator illustrated in FIG. 1.

First, a first embodiment of the present invention will be described. FIG. 1 is a plan view illustrating a configuration of an optical modulator 100 according to the first embodiment of the present invention, FIG. 2 is a side view of the optical modulator 100, and FIG. 3 is a partial detail view of a part A in FIG. 1.

The optical modulator 100 includes an optical modulation element 102, a housing 104 that accommodates the optical modulation element 102, an input optical fiber 108 for inputting light into the optical modulation element 102, and an output optical fiber 110 that guides the light output from the optical modulation element 102 to an outside of the housing 104.

The optical modulation element 102 is, for example, a DP-QPSK modulator that performs optical modulation of 400 Gb/s, and includes, for example, four Mach-Zehnder type optical waveguides provided on an LN substrate. The four Mach-Zehnder type optical waveguides are provided with four signal electrodes 112a, 112b, 112c, and 112d (hereinafter, collectively also referred to as a signal electrode 112) that respectively modulate light waves propagating through the Mach-Zehnder type optical waveguide. In addition, as known in the related art, on a surface of the LN substrate of the optical modulation element 102, for example, ground electrodes 122a, 122b, 122c, 122d, and 122e (see FIG. 3 and not illustrated in FIG. 1) are provided so that each of the four signal electrodes 112a, 112b, 112c, and 112d includes a coplanar waveguide (CPW).

Specifically, the ground electrodes 122a, 122b, 122c, 122d, and 122e (hereinafter, collectively also referred to as a ground electrode 122) are disposed so as to respectively sandwich the signal electrodes 112a, 112b, 112c, and 112d therebetween in a surface of the LN substrate, and constitute a coplanar waveguide having a predetermined characteristic impedance in a predetermined operating frequency together with the four signal electrodes 112a, 112b, 112c, and 112d.

Four high-frequency electrical signals (modulation signals) are respectively input to the four signal electrodes 112. These high-frequency electrical signals cooperate to control the propagation of the light wave in the four Mach-Zehnder type optical waveguides, and perform the operation of DP-QPSK modulation of 400 Gb/s as a whole.

Specifically, two pairs of high-frequency electrical signals, one pair of which includes two high-frequency electrical signals, are applied to the four respective signal electrodes 112. The optical modulation element 102 is configured to generate two modulated light beams each of which is modulated by one pair of electrical signals. The two generated modulated light beams are respectively output from two output optical waveguides 126a and 126b that form a part of the optical modulation element 102. In the present embodiment, two high-frequency electrical signals forming one pair are applied to the signal electrodes 112a and 112b to generate modulated light output from the output optical waveguide 126a, and other two high-frequency electrical signals forming another pair are applied to the signal electrodes 112c and 112d to generate modulated light output from the output optical waveguide 126b. These two modulated light beams are combined into one beam by a polarization-combining part 128 including a polarization combining prism or the like, and then output to the outside of the housing 104 via the output optical fiber 110.

The housing 104 includes a case 114a to which the optical modulation element 102 is fixed and a cover 114b. In order to facilitate understanding of the configuration inside the housing 104, only a part of the cover 114b is illustrated on the left side in FIG. 1, but actually, the cover 114b is disposed to cover the entire box-shaped case 114a and hermetically seals the inside of the housing 104. The case 114a is made of a metal or a ceramic plated with gold, for example, and functions electrically as an electrical conductor. The housing 104 can be usually provided with a plurality of pins for DC control or the like, which are omitted in FIG. 1.

In the case 114a, electrical connectors 116a, 116b, 116c, and 116d (hereinafter, collectively also referred to as electrical connectors 116), which are coaxial connectors including input signal terminals 124a, 124b, 124c, and 124d (hereinafter, collectively also referred to as a input signal terminal 124) that input the high-frequency electrical signal to be applied to each of the signal electrodes 112a, 112b, 112c, and 112d of the optical modulation element 102 are provided.

Each of the electrical connectors 116 is, for example, a socket for a push-on coaxial connector, including a cylindrical ground conductor, and the input signal terminal 124 includes a center conductor (core wire) extending along a center line of the cylindrical ground conductor. Each of the cylindrical ground conductors is electrically connected and fixed to the case 114a. Therefore, the case 114a constitutes a ground line that supplies a ground potential. Further, each of the input signal terminals 124 is electrically connected to one end of each of the signal electrodes 112 of the optical modulation element 102, via a relay substrate 118.

The other end of the signal electrode 112 of the optical modulation element 102 is terminated by a terminator 120 having a predetermined impedance. Thus, the electrical signals input to the one ends of the signal electrodes 112 respectively propagate in the signal electrodes 112 as traveling waves.

FIG. 3 illustrates a configuration of the relay substrate 118 and its surroundings. On the relay substrate 118, signal conductor pattern 330a, 330b, 330c, and 330d (hereinafter, collectively also referred to as a signal conductor pattern 330) and ground conductor pattern 340a, 340b, 340c, 340d, and 340e (hereinafter, collectively also referred to as a ground conductor pattern 340) are formed.

On the relay substrate 118, a rear surface ground conductor (not illustrated) is formed on a rear surface facing a front surface (a surface illustrated in FIG. 3 in which the signal conductor pattern 330 and the ground conductor pattern 340 are formed). The rear surface ground conductor is fixed to the case 114a of the housing 104 with, for example, solder, a brazing material, a conductive adhesive, or the like. Thus, the rear surface ground conductor becomes a ground line component. Each of the ground conductor patterns 340 is connected to the rear surface ground conductor and connected to the ground line through an appropriate via (not illustrated).

The ground conductor patterns 340a, 340b, 340c, 340d, and 340e are provided so as to sandwich the respective signal conductor patterns 330a, 330b, 330c, and 330d in a front surface of the relay substrate 118. Thus, each of the signal conductor patterns 330 and the ground conductor pattern 340 form a coplanar waveguide.

In the present embodiment, the signal conductor pattern 330 extends in an upward-downward direction illustrated in FIG. 3, and among sides of the relay substrate 118, one end of a side on a lower side illustrated in FIG. 3 is connected to the input signal terminal 124. Here, among the sides of the relay substrate 118, a side on which the signal conductor pattern 330 and the input signal terminal 124 are connected is referred to as a signal input side 318a.

Each of the signal electrodes 112 of the optical modulation element 102 is electrically connected to another end of the signal conductor pattern 330 of the relay substrate 118, on an upper side illustrated in FIG. 3 among sides of the relay substrate 118, by wire bonding using a conductor wire 326, for example. The conductor wire 326 can be a gold wire, for example. Here, among the sides of the relay substrate 118, a side on which the signal conductor pattern 330 and the signal electrode 112 of the optical modulation element 102 are connected is referred to as a signal output side 318b. In the present embodiment, the signal input side 318a and the signal output side 318b form two sides facing each other in the relay substrate 118 in a plan view. Among the sides of the relay substrate 118 in FIG. 3, the other two sides facing each other, other than the signal input side 318a and the signal output side 318b are referred to as side edges (lateral sides) 318c and 318d.

In the optical modulation element 102, the respective ground electrodes 122 that constitute the coplanar waveguide together with the signal electrodes 112 are electrically connected to one ends of the respective ground conductor patterns 340 at the signal output side 318b of the relay substrate 118, by wire bonding using the conductor wires 326, for example, in the same manner as described above. The wire bonding using the conductor wire 326 described above is an example, and the present invention is not limited to this. Instead of wire bonding of the conductor wire 326, for example, ribbon bonding using a conductor ribbon such as a gold ribbon can be used.

In the present embodiment, regarding at least one signal conductor pattern 330, each of the two ground conductor patterns 340 sandwiching the signal conductor pattern 330 on the relay substrate 118 is formed in an asymmetrical shape in a plan view with respect to the at least one signal conductor pattern 330, in a rectangular connection area in the plan view including a signal connection portion at which the signal conductor pattern 330 and the input signal terminal 124 are connected. Here, the connection area is defined as a rectangle extending in a plane of the relay substrate 118 by setting a part of the signal input side 318a as one side in a width direction. Further, the connection area is centered on the at least one signal conductor pattern 330 in the width direction. A width of the connection area is equal to a distance from the at least one signal conductor pattern 330 to the nearest adjacent signal conductor pattern 330, and a height of the connection area is equal to a distance from the signal input side 318a to an end of the signal connection portion farthest from the signal input side 318a.

In the present embodiment, the input signal terminal 124 is directly connected to the signal conductor pattern 330 by soldering or the like, but the present embodiment is not limited to this. The input signal terminal 124 may be connected to the signal conductor pattern 330 via a conductor wire or a conductor ribbon by wire bonding or the like. In this case, the signal connection portion between the signal conductor pattern 330 and the input signal terminal 124 can be a range in which the conductor wire or the like is connected on the signal conductor pattern 330. Therefore, in this case, the above-described "end of signal connection portion farthest from signal input side 318a" is a "farthest wire connection portion from signal input side 318a among wire connection portions at which conductor wire or the like is connected at signal conductor pattern 330".

Figure 4:
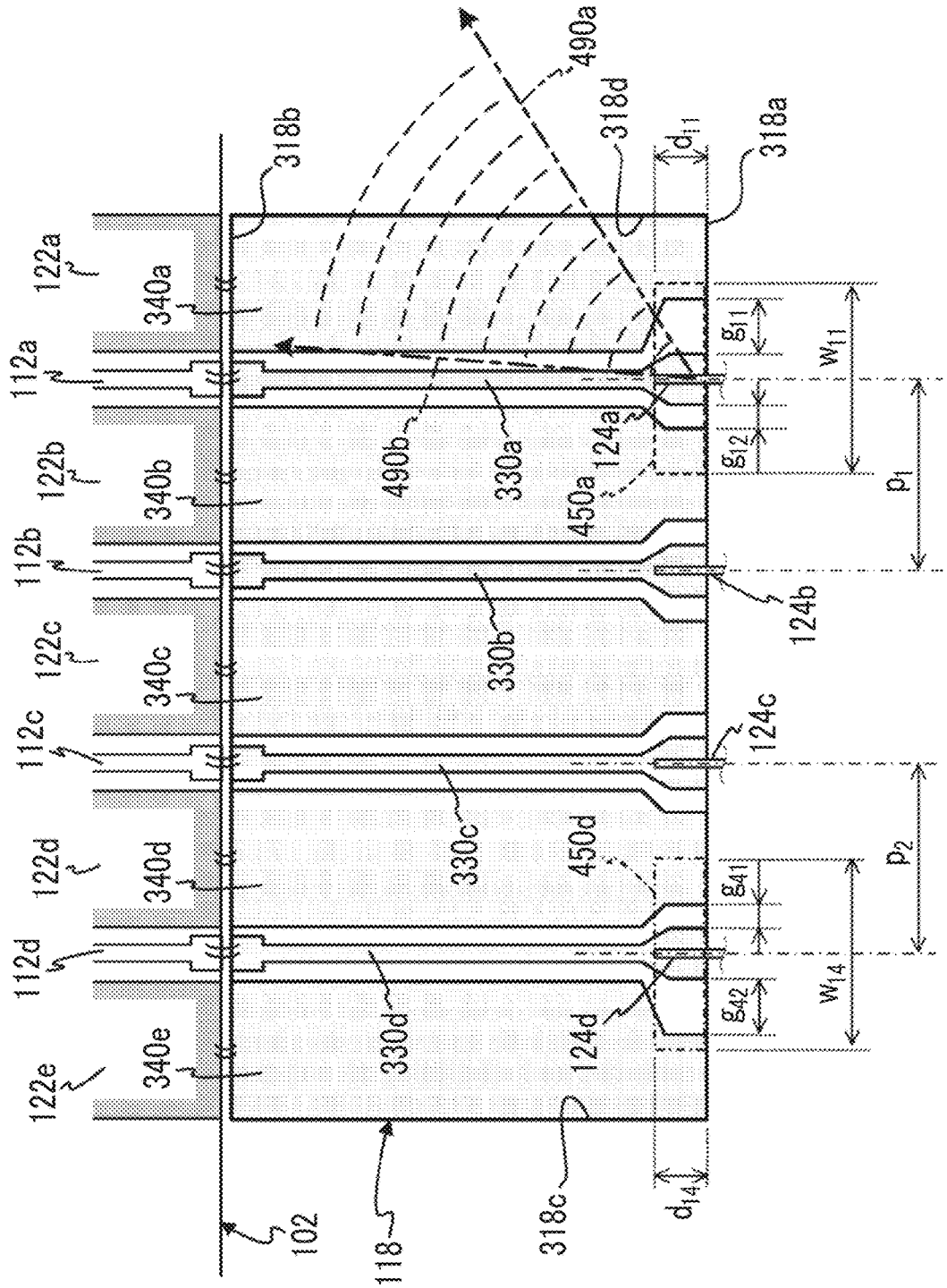
FIG. 4 is a detailed view of a part B in the detailed view of the part A illustrated in FIG. 3.

FIG. 4 is a partial detail view of a part B illustrated in FIG. 3. In the present embodiment, as an example, the two ground conductor patterns 340a and 340b sandwiching the signal conductor pattern 330a on the relay substrate 118 are formed in an asymmetrical shape with respect to the signal conductor pattern 330b in a plan view, in a connection area 450a including a signal connection portion at which the signal conductor pattern 330b and the input signal terminal 124b are connected.

Here, the connection area 450a is defined for the signal conductor pattern 330a. That is, assuming that an extending direction of the signal input side 318a of the relay substrate 118 is a width direction and a direction orthogonal to the extending direction is a height direction, the connection area 450a is defined as a rectangular range having the signal input side 318a as one side and having a predetermined width w11 and a predetermined height d11 centered on the signal conductor pattern 330a. Here, the height d11 is a distance from the signal input side 318a to a far end of a signal connection portion at which the signal conductor pattern 330a and the input signal terminal 124a are connected (that is, an end far from the signal input side 318a). Further, the width w11 is equal to a distance (pitch) p1 between patterns from the signal conductor pattern 330a to the nearest adjacent signal conductor pattern 330b.

The signal conductor pattern 330a and the ground conductor patterns 340a and 340b are formed so that characteristic impedances of the signal conductor pattern 330a have the same value inside and outside the connection area 450a.

In the same manner, in the present embodiment, the two ground conductor patterns 340d and 340e sandwiching the signal conductor pattern 330d are formed in an asymmetrical shape with respect to the signal conductor pattern 330d in a plan view, in the connection area 450d defined for the signal conductor pattern 330d. The connection area 450d is a rectangular range having a signal input side 318a as one side, and has a width w14 centered on the signal conductor pattern 330d and a predetermined height d14. Here, the height d14 is a distance from the signal input side 318a to a far end of a signal connection portion between the signal conductor pattern 330d and the input signal terminal 124d, and the width w14 is equal to a distance p2 between patterns from the signal conductor pattern 330d to the nearest adjacent signal conductor pattern 330c. Further, the signal conductor pattern 330d and the ground conductor pattern 340d and 340e are formed so that characteristic impedances of the signal conductor pattern 330d have the same value inside and outside the connection area 450d.

More specifically, in the present embodiment, gaps (g11 and g12 in FIG. 4) from respective edges of the two ground conductor patterns 340a and 340b to opposite edges of the signal conductor pattern 330a have different portions in the connection area 450a, so that the two ground conductor patterns 340a and 340b sandwiching the signal conductor pattern 330a have an asymmetrical shape with respect to the signal conductor pattern 330a.

In the same manner, gaps (g41 and g42 in FIG. 4) from respective edges of the two ground conductor patterns 340d and 340e to opposite edges of the signal conductor pattern 330d have different portions in the connection area 450d, so that the two ground conductor patterns 340d and 340e sandwiching the signal conductor pattern 330d have an asymmetrical shape with respect to the signal conductor pattern 330d. Here, g11 and g12, and g41 and g42 are respectively set to have distances under a condition that, for example, the characteristic impedances of the signal conductor patterns 330a and 330d inside and outside the respective connection areas 450a and 450d are equal to each other.

In general, in a high-frequency signal line including a signal conductor and a ground conductor, the smaller the distance between the signal conductor and the ground conductor, the stronger the confinement of the high-frequency signal in the signal conductor.

In the relay substrate 118, distances from the signal conductor pattern 330a to the ground conductor patterns 340a and 340b are different from each other, in the connection area 450a. Therefore, leaked microwaves generated from the signal connection portion between the signal conductor pattern 330a and the input signal terminal 124a (therefore, generated from the connection area 450a) are biased in a direction in which a distance from the adjacent ground conductor pattern is large, that is, a direction of the opposite ground conductor pattern 340a with the distance g11 (>g12) (for example, in a direction range illustrated as a range sandwiched by arrows 490a and 490b of the alternate long and short dash lines in FIG. 4), and will be emitted so as to have a larger intensity distribution than in other directions. On the other hand, since the signal conductor pattern 330a is configured to have the same characteristic impedance inside and outside the connection area 450a, the total amount of leaked microwaves generated from the signal connection portion is approximately the same as a case where g11 and g12 are configured to have the same value.

As a result, intensities of the leaked microwaves in a direction range other than the direction range sandwiched by the arrows 490a and 490b is relatively reduced, and crosstalk via the leaked microwaves from the signal conductor pattern 330a to the adjacent signal conductor pattern 330b is reduced.

According to the same principle, leaked microwaves generated from the signal connection portion between the signal conductor pattern 330d and the input signal terminal 124d (therefore, generated from the connection area 450d) are emitted toward a direction of the opposite ground conductor pattern 340e with a distance g42 (>g41) so as to have a larger intensity distribution than the other directions. As a result, intensities of the leaked microwaves propagating in a direction of the adjacent signal conductor pattern 330c are relatively reduced, and crosstalk via the leaked microwaves from the signal conductor pattern 330d toward the adjacent signal conductor pattern 330c is reduced.

In particular, in an optical modulator that generates two modulated light beams, each of which is modulated by a pair of high-frequency electrical signals, such as the optical modulator 100 that performs DP-QPSK modulation, the two paired high-frequency electrical signals often carry information for a phase difference between each other. Therefore, crosstalk between the two paired high-frequency electrical signals also generates a phase noise in addition to an intensity noise, and can have a greater influence on the modulation characteristics of the optical modulator 100 than crosstalk between different pairs of high-frequency electrical signals.

Since the paired high-frequency electrical signals are generally relayed by using two adjacent signal conductor patterns on the relay substrate, it is extremely important to suppress crosstalk between two adjacent signal conductor patterns that respectively propagate the two paired high-frequency electrical signals.

The optical modulator 100 of the present embodiment is configured to respectively propagate two high-frequency electrical signals that form one pair of the two pairs of high-frequency electrical signals by the adjacent signal conductor patterns 330a and 330b, and to propagate an other two paired high-frequency electrical signals, by the other adjacent signal conductor patterns 330c and 330d. Then, with the above configuration, the crosstalk from the signal conductor pattern 330a to the signal conductor pattern 330b, that is, crosstalk from one of the two high-frequency electrical signals forming one pair to the other is reduced. Further, with the above configuration, the crosstalk from the signal conductor pattern 330d to the signal conductor pattern 330c, that is, crosstalk from one of the two high-frequency electrical signals forming the other pair to the other is also reduced. As a result, the optical modulator 100 can effectively reduce the influence of leaked microwaves and realize appropriate optical modulation characteristics.

In the present embodiment, the two ground conductor patterns 340a and 340b, and 340d and 340e respectively sandwiching the signal conductor patterns that are not sandwiched between the adjacent signal conductor patterns, that is, the signal conductor patterns 330a and 330d located at the left and right ends of the arrangement of the four signal conductor patterns 330 include an asymmetrical shape with respect to the signal conductor patterns 330a and 330d in the connection area 450a and 450d, respectively, but the embodiment is not limited to this. In the same manner, for the signal conductor patterns 330b or 330c respectively sandwiched between the two signal conductor patterns 330a and 330c, or 330b and 330d, the two ground conductor patterns 340b and 340c, or 340c and 340d, which respectively sandwich the signal conductor patterns 330b or 330c, can have an asymmetrical shape with respect to the signal conductor pattern 330b or 330c in a predetermined connection area, respectively.

In this case, a width of the connection area for the signal conductor pattern sandwiched between the adjacent signal conductor patterns (that is, a width corresponding to w11 or w14 in FIG. 4) can be equal to a distance to the nearest adjacent signal conductor pattern.

Next, a modification example of the relay substrate used in the optical modulator 100 will be described.

First Modification Example

Figure 5:
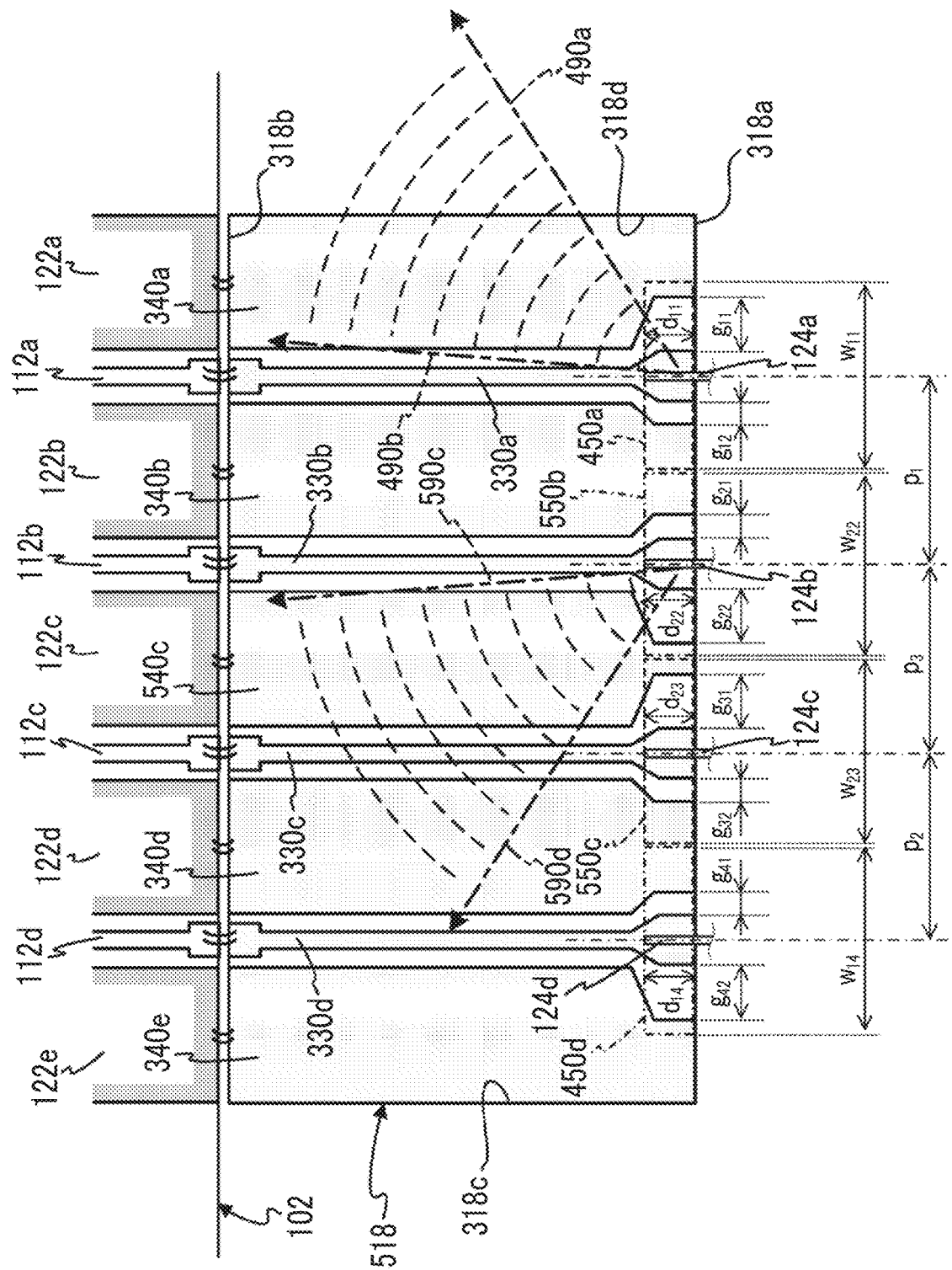
FIG. 5 is a diagram illustrating a configuration of a relay substrate according to a first modification example of the optical modulator according to the first embodiment.

FIG. 5 is a diagram illustrating a configuration of a relay substrate 518 according to a first modification example, and is a diagram corresponding to the partial detail view of the first embodiment illustrated in FIG. 4. The relay substrate 518 can be used instead of the relay substrate 118 in the optical modulator 100 illustrated in FIG. 1. In FIG. 5, the same reference numerals as those in FIG. 4 are used for the same components as those of the components of the relay substrate 118 illustrated in FIG. 4, and the above description of FIG. 4 is adopted.

The relay substrate 518 has the same configuration as the relay substrate 118, but has a difference that a ground conductor pattern 540c is provided instead of the ground conductor pattern 340c. Thus, in the relay substrate 518, in addition to the signal conductor patterns 330a and 330d, regarding the signal conductor patterns 330b and 330c, in connection areas 550b and 550c defined for these signal conductor patterns 330b and 330c, the ground conductor patterns 340b and 540c and the ground conductor patterns 540c and 340d respectively sandwiching the signal conductor patterns 330b and 330c are configured in an asymmetrical shape with respect to the signal conductor patterns 330b and 330c, respectively.

In the same manner as the connection areas 450a and 450d defined for the signal conductor patterns 330a and 330d, the connection areas 550b and 550c defined for the signal conductor patterns 330b and 330c are a rectangular range having a width w22 and a predetermined height d22 centered on the signal conductor pattern 330b, and a rectangular range having a width w23 and a predetermined height d23 centered on the signal conductor pattern 330c, respectively having the signal input side 318a as one side.

The widths w22 and w23 can be values equal to distances from the signal conductor patterns 330b and 330c to the nearest adjacent signal conductor pattern, respectively.

For example, in a case where the distance p1 between the signal conductor patterns 330a and 330b, the distance p2 between the signal conductor patterns 330c and 330d, and a distance p3 between the signal conductor patterns 330b and 330c have a relationship of p1>p2>p3, a distance to the nearest adjacent signal conductor pattern for both the signal conductor patterns 330b and 330c is p3. Therefore, the widths w22 and w23 of the connection area 550b and 550c are both equal to p3.

In the present modification example, p1=p2=p3, and w11=w22=w23=W14=p1=p2=p3.

In the same manner as the heights d11 and d14, the heights d22 and d23 are defined by a distance from the signal input side 318a to a far end of the signal connection portion between the signal conductor pattern 330b and the input signal terminal 124d, and a distance to a far end of the signal connection portion between the signal conductor pattern 330c and the input signal terminal 124c.

Specifically, in the same manner as the ground conductor patterns 340a and 340e, within the connection area 550b, the ground conductor pattern 540c is configured so that a gap g22 between the ground conductor pattern 540c and the signal conductor pattern 330b is different from a gap g21 (more specifically, larger than g21) between the signal conductor pattern 330b and the ground conductor pattern 340b. Further, the ground conductor pattern 540c is configured so that a gap g31 between the ground conductor pattern 540c and the signal conductor pattern 330c is different from a gap g32 (more specifically, greater than g32) between the signal conductor pattern 330c and the ground conductor pattern 340d within the connection area 550c. In the relay substrate 518 as well, the signal conductor patterns 330 and the ground conductor patterns 340a, 340b, 540c, 340d, and 340e are formed so that respective characteristic impedances of the signal conductor patterns 330 are the same inside and outside the connection areas of 450a, 550b, 550c, and 450d.

Thus, in the relay substrate 518, a gap g22 is set to be larger than a gap g21 within the connection area 550b, so that leaked microwaves generated at the signal connection portion between the signal conductor pattern 330b and the input signal terminal 124b (therefore, generated from the connection area 550b) have a larger intensity distribution than the other angular ranges in an angular range sandwiched between arrows 590c and 590d of broken lines, for example, in a direction of the ground conductor pattern 540c. As a result, an intensity of a part of the leaked microwave that reaches the adjacent signal conductor pattern 330a within the other angular range is relatively reduced.

That is, in the same manner as the relay substrate 118, in the relay substrate 518, an intensity of a part of the leaked microwave generated at the signal connection portion between the signal conductor pattern 330a and the input signal terminal 124a that reaches the adjacent signal conductor pattern 330b is reduced, and an intensity of a part of the leaked microwave generated at the signal connection portion between the signal conductor pattern 330b and the input signal terminal 124b that reaches the adjacent signal conductor pattern 330a is also reduced.

Therefore, in the relay substrate 518, crosstalk between the signal conductor patterns 330a and 330b respectively propagating the two paired high-frequency electrical signals is effectively suppressed.

In the same manner, in the relay substrate 518, an intensity of a part of the leaked microwave generated at the signal connection portion between the signal conductor pattern 330d and the input signal terminal 124d that reaches the adjacent signal conductor pattern 330c is reduced in the same manner as the relay substrate 118, and an intensity of apart of the leaked microwave generated at the signal connection portion between the signal conductor pattern 330c and the input signal terminal 124c (therefore, generated from the connection area 550c) that reaches the adjacent signal conductor pattern 330d is also reduced by setting a gap g31 to be larger than a gap g32 within the connection area 550c.

Therefore, in the relay substrate 518, crosstalk between the signal conductor patterns 330c and 330d, which respectively propagate the other two high-frequency electrical signals forming the other pair, is effectively suppressed.

As a result, the relay substrate 518 can realize further appropriate optical modulation characteristics than the case where the relay substrate 118 is used.

Second Modification Example

Figure 6:
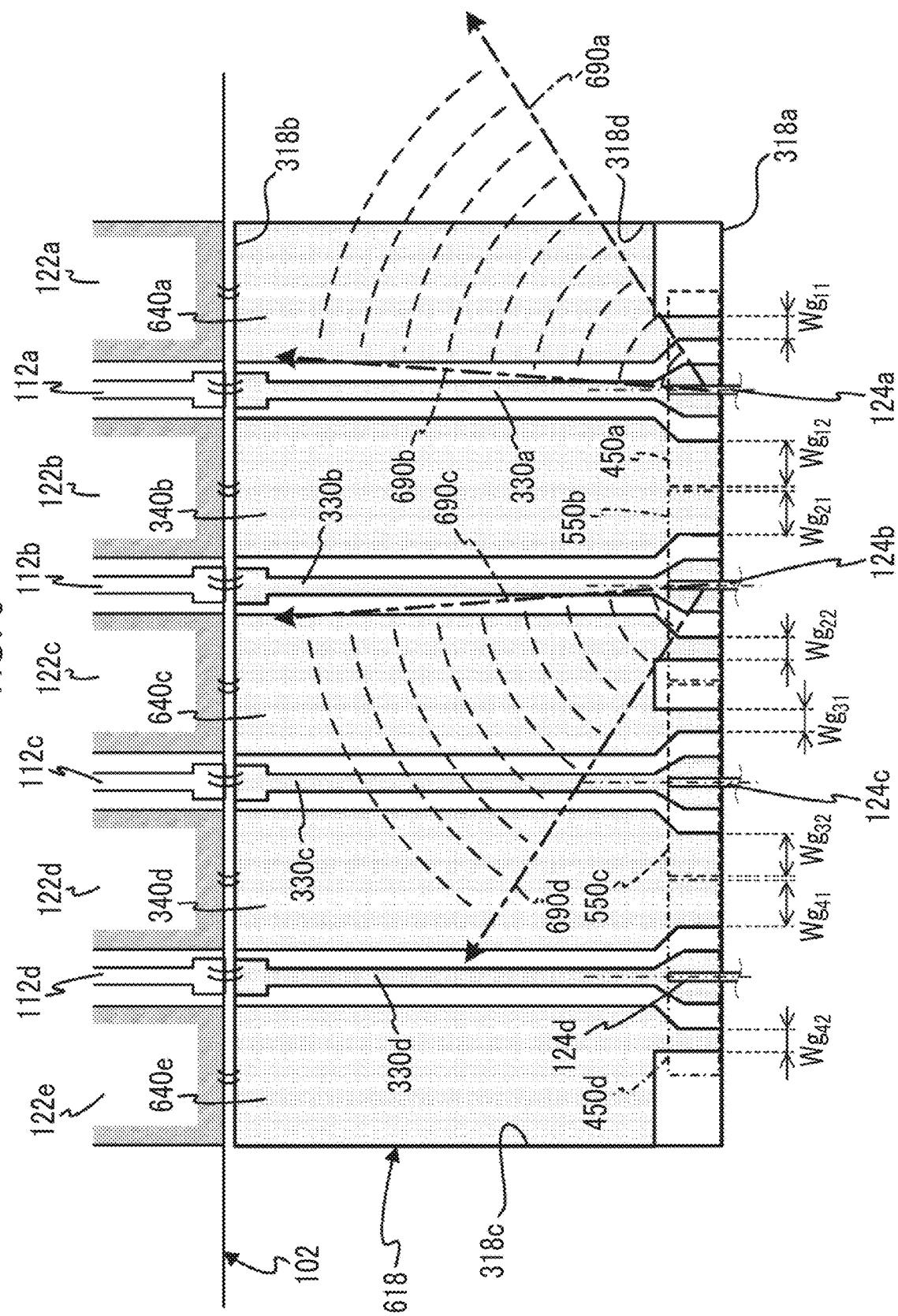
FIG. 6 is a diagram illustrating a configuration of a relay substrate according to a second modification example of the optical modulator according to the first embodiment.

FIG. 6 is a diagram illustrating a configuration of a relay substrate 618 according to a second modification example, and is a diagram corresponding to the partial detail view of the first embodiment illustrated in FIG. 4. The relay substrate 618 can be used instead of the relay substrate 118 in the optical modulator 100 illustrated in FIG. 1. In FIG. 6, the same reference numerals as those in FIGS. 4 and 5 are used for the same components as those of the components of the relay substrates 118 and 518 illustrated in FIGS. 4 and 5, and the above descriptions of FIGS. 4 and 5 are adopted.

The relay substrate 618 is formed with the signal conductor patterns 330, in the same manner as the relay substrates 118 and 518. Therefore, in the relay substrate 618, the connection areas 450a, 550b, 550c, and 450d are defined for each of the signal conductor patterns 330, in the same manner as the relay substrate 518.

The relay substrate 618 has the same configuration as the relay substrate 118, but has a difference that ground conductor patterns 640a, 640c, and 640e are provided instead of the ground conductor patterns 340a, 340c, and 340e. In the relay substrate 618 as well, the signal conductor patterns 330 and the ground conductor patterns 640a, 340b, 640c, 340d, and 640e are formed so that characteristic impedances of the signal conductor patterns 330 are the same inside and outside the connection areas of 450a, 550b, 550c, and 450d.

In the relay substrate 618 according to the present modification example, two ground conductor patterns sandwiching at least one signal conductor pattern 330 are configured in an asymmetrical shape, by setting widths of respective portions formed within a connection area defined for the signal conductor pattern, measured in a direction orthogonal to an extending direction of the signal conductor pattern to be different from each other.

Specifically, in the relay substrate 618, the ground conductor pattern 640a sandwiching the signal conductor pattern 330a together with the ground conductor pattern 340b is configured in an asymmetrical shape with the ground conductor pattern 340b with respect to the signal conductor pattern 330a in the connection area 450a, by setting a width Wg11 of a portion formed in the connection area 450a to be different from a width Wg12 of a portion formed in the connection area 450a in the ground conductor pattern 340b (specifically, for example, Wg11<Wg12).

In general, in a high-frequency signal line including a signal conductor and a ground conductor, the smaller the impedance from the ground conductor to a portion that supplies the ground potential (so-called ground line) (that is, the more so-called ground strengthening is sufficient), the stronger confinement of the high-frequency signal in the signal conductor.

In the relay substrate 618, the formation widths Wg11 and Wg12 of the portions, formed in the connection area 450a, in the ground conductor patterns 640a and 340b sandwiching the signal conductor pattern 330a are different from each other. Thus, leaked microwaves generated from a signal connection portion between the signal conductor pattern 330a and the input signal terminal 124a are emitted toward a direction of a ground conductor pattern having a narrow formation width and a larger impedance to the ground line (for example, rear surface ground conductor) among the adjacent ground conductor patterns, that is, a direction of the ground conductor pattern 640a having the formation width Wg11 (<Wg12) (for example, in a direction range illustrated as a range sandwiched by arrows 690a and 690b of alternate long and short dash lines in FIG. 6) so as to have a larger intensity distribution than in other directions.

Therefore, intensities of the leaked microwaves in a direction range other than the direction range sandwiched by the arrows 690a and 690b are relatively reduced. For example, crosstalk via the leaked microwave from the signal conductor pattern 330a toward the adjacent signal conductor pattern 330b is reduced.

Further, in the relay substrate 618, formation widths Wg21 and Wg22 of the portions in the connection area 550b of the ground conductor patterns 340b and 640c sandwiching the signal conductor pattern 330b are different from each other. Thus, leaked microwaves generated from a signal connection portion between the signal conductor pattern 330b and the input signal terminal 124b are emitted toward a direction of the ground conductor pattern 640c having the formation width Wg22 narrower than Wg21 and a larger impedance to the ground line (for example, in a direction range illustrated as a range sandwiched by arrows 690c and 690d of alternate long and short dash lines in FIG. 6) so as to have a larger intensity distribution than the other directions.

Therefore, intensities of the leaked microwaves in a direction range other than the direction range sandwiched by the arrows 690c and 690d are relatively reduced. For example, crosstalk via the leaked microwave from the signal conductor pattern 330b toward the adjacent signal conductor pattern 330a is also reduced. As a result, in the same manner as the relay substrate 518 illustrated in FIG. 5, crosstalk between the signal conductor patterns 330a and 330b respectively propagating the two paired high-frequency electrical signals is effectively suppressed.

In the same manner, in the relay substrate 618, formation widths Wg31 and Wg32 of portions in the connection area 550c of the ground conductor patterns 640c and 340d sandwiching the signal conductor pattern 330c have an asymmetric relationship of Wg31<Wg32, and formation widths Wg41 and Wg42 of portions in the connection area 450d of the ground conductor patterns 340d and 640e sandwiching the signal conductor pattern 330d have an asymmetric relationship of Wg41>Wg42.

Therefore, in the relay substrate 618, crosstalk from the signal conductor pattern 330c to the adjacent signal conductor pattern 330d via the leaked microwave generated from the signal connection portion between the signal conductor pattern 330c and the input signal terminal 124c and crosstalk from the signal conductor pattern 330d to the adjacent signal conductor pattern 330c via the leaked microwave generated from the signal connection portion between the signal conductor pattern 330d and the input signal terminal 124d are suppressed.

As a result, in the relay substrate 618, in the same manner as the relay substrate 518 illustrated in FIG. 5, crosstalk between paired high-frequency signals is further suppressed and appropriate optical modulation characteristics can be realized, as compared with the relay substrate 118.

In particular, in the configuration of the relay substrate 618, in the connection areas 450a, 550b, 550c, and 450d, although the formation widths of the ground conductor patterns 640a, 640b, 640c, 340d, and 640e each of which sandwiches the corresponding signal conductor pattern 330 are different from each other, distances from the respective signal conductor patterns 330 to opposite edges of the adjacent ground conductor patterns 640a, 340b, 640c, 340d, 640e are equal to each other. Therefore, even when the formation widths of the ground conductor patterns 640a, 640b, 640c, 340d, and 640e sandwiching the signal conductor patterns 330 are changed, a change in the characteristic impedance of the signal conductor pattern 330 is small. Therefore, the relay substrate 618 can be easily configured so that the characteristic impedance of each of the signal conductor patterns 330 does not change inside and outside the connection areas 450a, 550b, 550c, and 450d. However, even when a difference in formation width in the connection area (for example, Wg11 and Wg12) of the two ground conductor patterns sandwiching the signal conductor pattern is set large, a polarization direction of the leaked microwaves do not change as much as in the case of the relay substrates 118 and 518.

Therefore, the configuration of the relay substrate 618 is appropriate when it is desired to suppress the influence of the leaked microwave while maintaining the consistency with the design in the related art (for example, pattern design in the related art for ground conductor pattern in relay substrate) as much as possible in the case where the influence of the leaked microwaves is relatively small.

Third Modification Example

Figure 7:
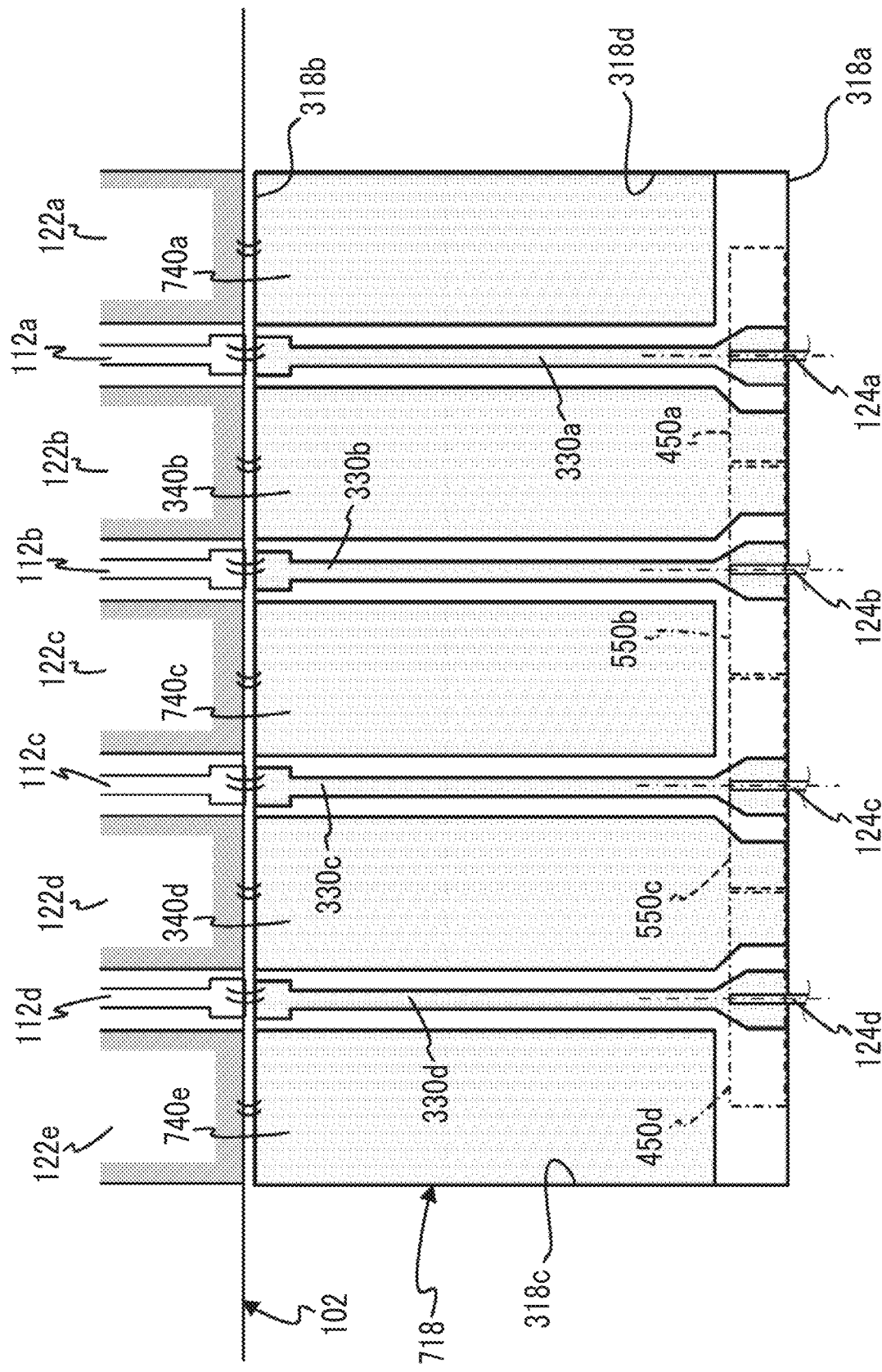
FIG. 7 is a diagram illustrating a configuration of a relay substrate according to a third modification example of the optical modulator according to the first embodiment.

FIG. 7 is a diagram illustrating a configuration of a relay substrate 718 according to a third modification example, and is a diagram corresponding to the partial detail view of the first embodiment illustrated in FIG. 4. The relay substrate 718 can be used instead of the relay substrate 118 in the optical modulator 100 illustrated in FIG. 1. In FIG. 7, the same reference numerals as those in FIGS. 4, 5, and 6 are used for the same components as those of the components of the relay substrates 118, 518, and 618 illustrated in FIGS. 4, 5, and 6, and the above descriptions of FIGS. 4, 5, and 6 are adopted.

The relay substrate 718 is formed with the signal conductor patterns 330 in the same manner as the relay substrates 118 and 518 illustrated in FIGS. 4 and 5. Therefore, in the relay substrate 718, the connection areas 450a, 550b, 550c, and 450d are defined for each of the signal conductor patterns 330, in the same manner as the relay substrate 518.

The relay substrate 718 has the same configuration as the relay substrate 118, but has a difference that ground conductor patterns 740a, 740c, and 740e are provided instead of the ground conductor patterns 340a, 340c, and 340e. In the relay substrate 718 as well, the signal conductor patterns 330 and the ground conductor patterns 740a, 340b, 740c, 340d, and 740e are formed so that characteristic impedances of the signal conductor patterns 330 are the same inside and outside the connection areas of 450a, 550b, 550c, and 450d.

In the relay substrate 718 according to the present modification example, one of two ground conductor patterns sandwiching at least one signal conductor pattern 330 is configured in an asymmetrical shape with respect to the signal conductor pattern, by not including a portion formed within a connection area defined for the signal conductor pattern.

Specifically, in the relay substrate 718, the one ground conductor pattern 740a does not include a pattern formed within the connection area 450a, so that the ground conductor patterns 740a and 340b sandwiching the signal conductor pattern 330a are formed asymmetrically with respect to the signal conductor pattern 330a. Further, in the relay substrate 718, the one ground conductor pattern 740c does not include a pattern formed within the connection area 550b, so that the ground conductor patterns 340b and 740c sandwiching the signal conductor pattern 330b are formed asymmetrically with respect to the signal conductor pattern 330b.

In the same manner, in the relay substrate 718, the one ground conductor pattern 740c does not include a pattern formed within the connection area 550c, so that the ground conductor patterns 740c and 340d sandwiching the signal conductor pattern 330c are formed asymmetrically with respect to the signal conductor pattern 330c. Further, in the relay substrate 718, the one ground conductor pattern 740e does not include a pattern formed within the connection area 450d, so that the ground conductor patterns 340d and 740e sandwiching the signal conductor pattern 330d are formed asymmetrically with respect to the signal conductor pattern 330d.

This relay substrate 718 corresponds to a case where Wg11, Wg22, Wg31, and Wg42 are set to 0 (zero) in the relay substrate 618 in FIG. 6 of the second modification example described above. Therefore, in the relay substrate 718, crosstalk via leaked microwaves between the signal conductor patterns 330a and 330b respectively propagating two paired high-frequency electrical signals, and crosstalk via leaked microwaves between the signal conductor patterns 330c and 330d respectively propagating the other two paired high-frequency electrical signals are further reduced, as compared with the relay substrate 618. As a result, in a case where the relay substrate 718 is used, further appropriate optical modulation characteristics can be realized as compared with the case where the relay substrate 618 is used.

In the present modification example, for example, the one ground conductor pattern 740a does not include a pattern formed within the connection area 450a, so that the ground conductor patterns 740a and 340b sandwiching the signal conductor pattern 330a are formed asymmetrically with respect to the signal conductor pattern 330a, but the present modification example is not limited to this. Instead of this, for example, the ground conductor patterns 740a and 340b sandwiching the signal conductor pattern 330a may be formed asymmetrically with respect to the signal conductor pattern 330a, by setting a range (area) in which the one ground conductor pattern 740a is formed within the connection area 450a to be smaller than a range (area) in which the other ground conductor pattern 340b is formed within the connection area 550b.

Fourth Modification Example

Figure 8:
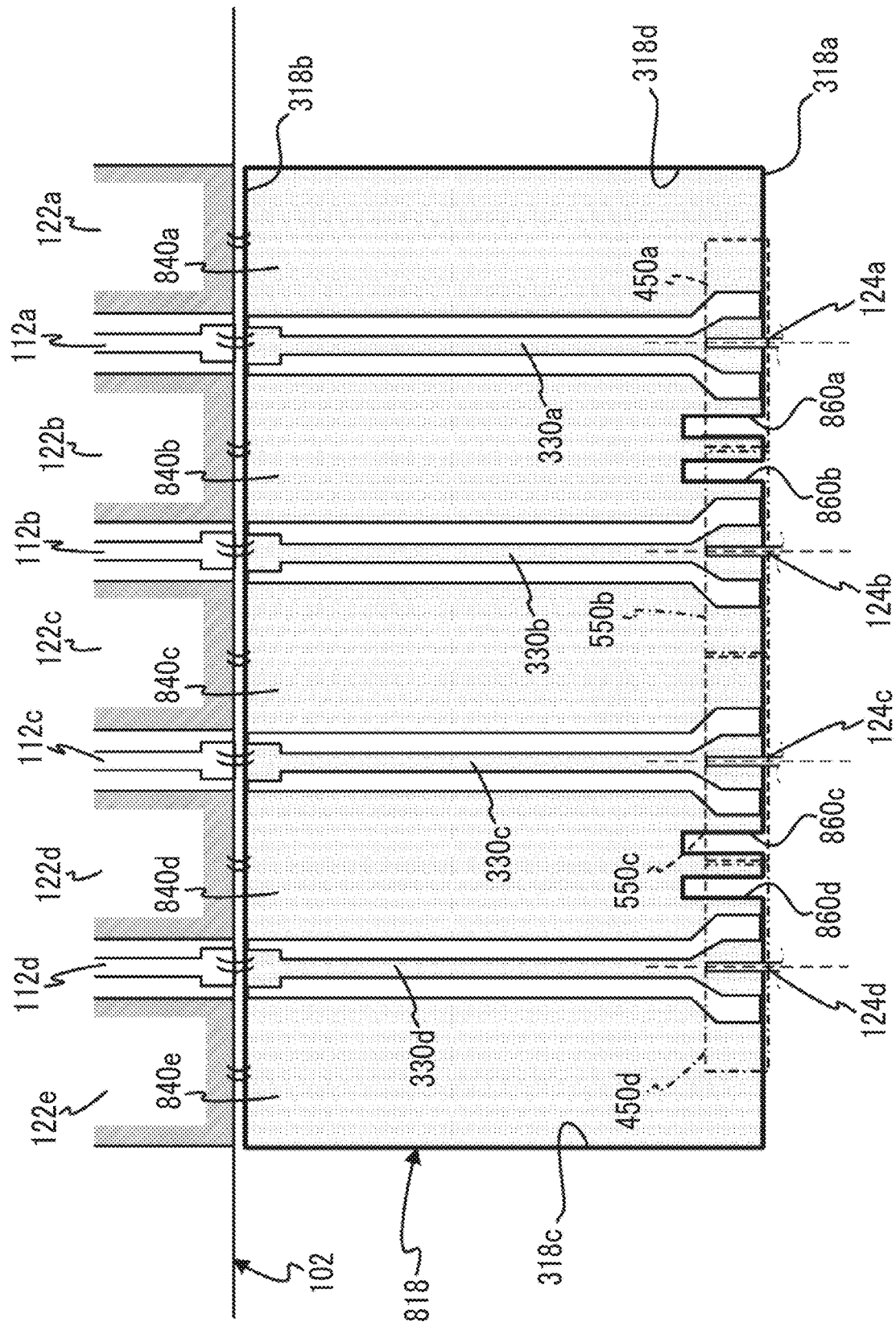
FIG. 8 is a diagram illustrating a configuration of a relay substrate according to a fourth modification example of the optical modulator according to the first embodiment.

FIG. 8 is a diagram illustrating a configuration of a relay substrate 818 according to a fourth modification example, and is a diagram corresponding to the partial detail view of the first embodiment illustrated in FIG. 4. The relay substrate 818 can be used instead of the relay substrate 118 in the optical modulator 100 illustrated in FIG. 1. In FIG. 8, the same reference numerals as those in FIGS. 4 and 5 are used for the same components as those of the components of the relay substrates 118 and 518 illustrated in FIGS. 4 and 5, and the above description of FIG. 4 is adopted.

The relay substrate 818 is formed with the signal conductor patterns 330 in the same manner as the relay substrates 118 and 518 of the first embodiment and the first modification example illustrated in FIGS. 4 and 5. Therefore, in the relay substrate 818, the connection areas 450a, 550b, 550c, and 450d are defined for each of the signal conductor patterns 330, in the same manner as the relay substrate 518.

The relay substrate 818 has the same configuration as the relay substrate 118, but has a difference that ground conductor patterns 840a, 840b, 840c, 840d, and 840e are provided instead of the ground conductor patterns 340a, 340b, 340c, 340d, and 340e. In the relay substrate 818 as well, the signal conductor patterns 330 and the ground conductor patterns 840a, 840b, 840c, 840d, and 840e are formed so that characteristic impedances of the signal conductor patterns 330 are the same inside and outside the connection areas of 450a, 550b, 550c, and 450d.

In the relay substrate 818 according to the present modification example, a notched portion extending from the signal input side 318a and penetrating the relay substrate 818 in a thickness direction is provided, at a portion at which one of the two ground conductor patterns sandwiching the signal conductor pattern 330 is formed, in a connection area for at least one signal conductor pattern 330.

As an example, in the relay substrate 818 illustrated in FIG. 8, a notched portion 860a extending from the signal input side 318a and penetrating the relay substrate 818 in the thickness direction is provided, at a portion at which one ground conductor pattern 840b of the two ground conductor patterns 840a and 840b sandwiching the signal conductor pattern 330a is formed, in the connection area 450a defined for the signal conductor pattern 330a. Thus, the ground conductor patterns 840a and 840b are configured in an asymmetrical shape with respect to the signal conductor pattern 330a in the connection area 450a.

In FIG. 8, an outline of the relay substrate 818 is drawn with a thick line in order to clearly illustrate the notched portion 860a and other notched portions 860b, 860c, and 860d which will be described below. Further, in FIG. 8, for the same purpose, broken lines and alternate long and short dash lines indicating the connection areas 450a, 550b, 550c, and 450d are drawn so as not to overlap the signal input side 318a of the relay substrate 818. However, the definitions of the connection areas 450a, 550b, 550c, and 450d have the same manner as the definitions in the first embodiment and its modification examples described above.

Further, in the relay substrate 818, the notched portion 860b extending from the signal input side 318a and penetrating the relay substrate 818 in the thickness direction is provided, at a portion at which one ground conductor pattern 840b of the two ground conductor patterns 840b and 840c sandwiching the signal conductor pattern 330b is formed, in the connection area 550b defined for the signal conductor pattern 330b.

With the above configuration, in the relay substrate 818, substrate leaked microwaves generated from a connection point between the signal conductor pattern 330a and the input signal terminal 124a and propagating in a substrate material of the relay substrate 818 is prevented from propagating to the adjacent signal conductor pattern 330b, by a space formed by the notched portion 860a. Further, substrate leaked microwaves generated from a connection point between the signal conductor pattern 330b and the input signal terminal 124b and propagating in the substrate material of the relay substrate 818 is prevented from propagating to the adjacent signal conductor pattern 330a, by a space formed by the notched portion 860b.

In the same manner, in the relay substrate 818, the notched portion 860c extending from the signal input side 318a and penetrating the relay substrate 818 in the thickness direction is provided, at a portion at which one ground conductor pattern 840d of the two ground conductor patterns 840c and 840d sandwiching the signal conductor pattern 330c is formed, in the connection area 550c defined for the signal conductor pattern 330c.

Further, in the relay substrate 818, the notched portion 860d extending from the signal input side 318a and penetrating the relay substrate 818 in the thickness direction is provided, at a portion at which one ground conductor pattern 840d of the two ground conductor patterns 840d and 840e sandwiching the signal conductor pattern 330d is formed, in the connection area 450d defined for the signal conductor pattern 330d.

With the above configuration, in the relay substrate 818, substrate leaked microwaves generated from a signal connection portion between the signal conductor pattern 330c and the input signal terminal 124c and propagating in the substrate material of the relay substrate 818 is prevented from propagating to the adjacent signal conductor pattern 330d, by a space formed by the notched portion 860c. Further, substrate leaked microwaves generated from a signal connection portion between the signal conductor pattern 330d and the input signal terminal 124d and propagating in the substrate material of the relay substrate 818 is prevented from propagating to the adjacent signal conductor pattern 330c, by a space formed by the notched portion 860d.

Therefore, in the relay substrate 818, crosstalk via substrate leaked microwaves between the signal conductor patterns 330a and 330b respectively propagating two paired high-frequency electrical signals, and crosstalk via substrate leaked microwaves between the signal conductor patterns 330c and 330d respectively propagating the other two paired high-frequency electrical signals are further reduced. As a result, if the relay substrate 818 is used in the optical modulator 100, appropriate optical modulation characteristics can be realized as the optical modulator 100.

In the relay substrate 818, if an inner wall of the notched portion 860a or the like is metallized so as to extend from the ground conductor pattern 840b or the like, the effect of suppressing the propagation of the substrate leaked microwaves as described above can be further enhanced.

Fifth Modification Example

Figure 9:
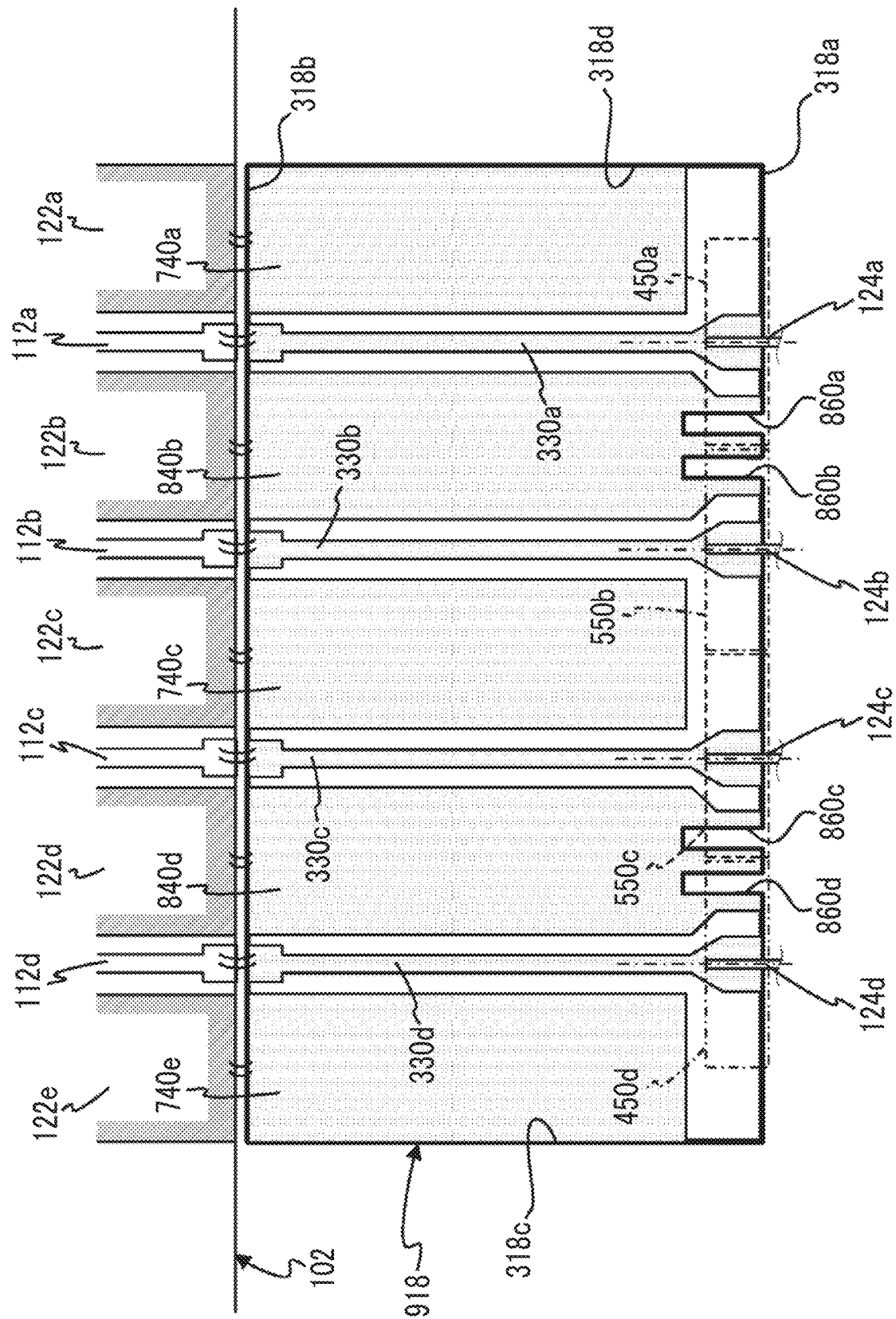
FIG. 9 is a diagram illustrating a configuration of a relay substrate according to a fifth modification example of the optical modulator according to the first embodiment.

FIG. 9 is a diagram illustrating a configuration of a relay substrate 918 according to a fifth modification example, and is a diagram corresponding to the partial detail view of the first embodiment illustrated in FIG. 4. The relay substrate 918 can be used instead of the relay substrate 118 in the optical modulator 100 illustrated in FIG. 1. In FIG. 9, the same reference numerals as those in FIGS. 4, 5, 6, 7, and 8 are used for the same components as those of the components of the relay substrates 118, 518, 618, 718, and 818 illustrated in FIGS. 4, 5, 6, 7, and 8, and the above descriptions of FIGS. 4, 5, 6, 7, and 8 are adopted.

The relay substrate 918 is formed with the signal conductor patterns 330 in the same manner as the relay substrates 118 and 518 of the first embodiment and the first modification example illustrated in FIGS. 4 and 5. Therefore, in the relay substrate 818, the connection areas 450a, 550b, 550c, and 450d are defined for each of the signal conductor patterns 330, in the same manner as the relay substrate 518.

Here, the relay substrate 918 is configured by combining the feature configurations of the relay substrate 718 in FIG. 7 of the third modification example and the relay substrate 818 in FIG. 8 of the fourth modification example. That is, the relay substrate 918 has the same configuration as the relay substrate 118, but has a difference that ground conductor patterns 740a, 840b, 740c, 840d, and 740e are provided instead of the ground conductor patterns 340a, 340b, 340c, 340d, and 340e. In the relay substrate 918 as well, the signal conductor patterns 330 and the ground conductor patterns 740a, 840b, 740c, 840d, and 740e are formed so that characteristic impedances of the signal conductor patterns 330 are the same inside and outside the connection areas of 450a, 550b, 550c, and 450d.

In particular, on the relay substrate 918, the four notched portions 860a, 860b, 860c, 860d extending from the signal input side 318a and penetrating the relay substrate 918 in a thickness direction are provided, at the same positions as the relay substrate 818 in FIG. 8 of the fourth modification example described above.

In FIG. 9, in the same manner as FIG. 8 of the fourth modification example described above, an outline of the relay substrate 918 is drawn with a thick line in order to clearly illustrate the notched portion 860a and other notched portions 860b, 860c, and 860d which will be described below. Further, in FIG. 9, for the same purpose, broken lines and alternate long and short dash lines indicating the connection areas 450a, 550b, 550c, and 450d are drawn so as not to overlap the signal input side 318a of the relay substrate 918. However, the definitions of the connection areas 450a, 550b, 550c, and 450d have the same manner as the definitions in the first embodiment and its modification examples described above.

Thus, in the relay substrate 918, in the same manner as the relay substrate 818 in FIG. 7 of the third modification example, crosstalk via substrate leaked microwaves is further reduced between the signal conductor patterns 330a and 330b respectively propagating the two paired high-frequency electrical signals, as compared with the case of the relay substrate 718. In the same manner, crosstalk via substrate leaked microwaves is further reduced between the signal conductor patterns 330*c* and 330*d* respectively propagating the other two paired high-frequency electrical signals in the same manner as the relay substrate 818, as compared with the case of the relay substrate 718 in FIG. 7 of the third modification example.

As a result, in a case where the relay substrate 918 is used for the optical modulator 100, further appropriate optical modulation characteristics can be realized as the optical modulator 100, as compared with the cases where the other relay substrates 118, 518, 628, 718, and 818 according to the first embodiment, the first modification example, the second modification example, the third modification example, and the fourth modification example illustrated in FIGS. 4, 5, 6, 7, and 8 described above are used.

In the same manner as the case of the relay substrate 818, if an inner wall of the notched portion 860*a* or the like is metallized so as to extend from the ground conductor pattern 840*b* or the like, the effect of suppressing the propagation of the substrate leaked microwaves can be further enhanced.

Sixth Modification Example

Figure 10:
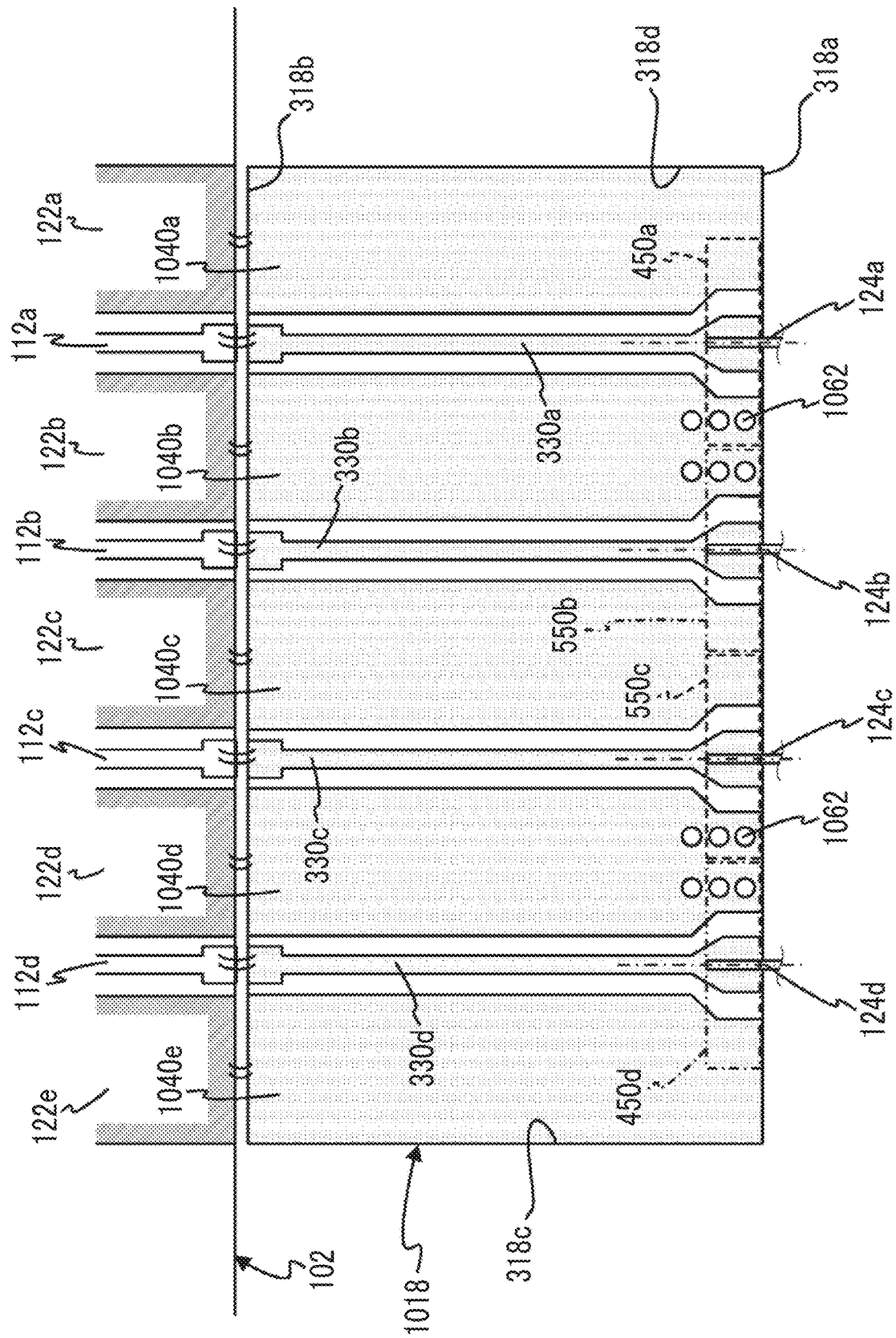
FIG. 10 is a diagram illustrating a configuration of a relay substrate according to a sixth modification example of the optical modulator according to the first embodiment.

FIG. 10 is a diagram illustrating a configuration of a relay substrate 1018 according to a sixth modification example, and is a diagram corresponding to the partial detail view of the first embodiment illustrated in FIG. 4. The relay substrate 1018 can be used instead of the relay substrate 118 in the optical modulator 100 illustrated in FIG. 1. In FIG. 10, the same reference numerals as those in FIGS. 4 and 5 are used for the same components as those of the components of the relay substrates 118 and 518 illustrated in FIGS. 4 and 5, and the above descriptions of FIGS. 4 and 5 are adopted.

The relay substrate 1018 is formed with the signal conductor patterns 330 in the same manner as the relay substrates 118 and 518 of the first embodiment and the first modification example illustrated in FIGS. 4 and 5. Therefore, in the relay substrate 818, the connection areas 450*a*, 550*b*, 550*c*, and 450*d* are defined for each of the signal conductor patterns 330, in the same manner as the relay substrate 118.

In the relay substrate 118 in FIG. 4 of the first embodiment described above, for example, the ground conductor patterns 340*a* and 340*b* sandwiching the signal conductor pattern 330*a* are formed in an asymmetrical shape with respect to the signal conductor pattern 330*a* within the connection area 450*a*, so that intensities with which leaked microwaves generated within the connection area 450*a* reaches the adjacent signal conductor pattern 330*b* is reduced. On the other hand, the relay substrate 1018 in the present modification example is formed so that within a connection area defined for at least one signal conductor pattern, respective portions, within the connection portion, of two adjacent ground conductor patterns sandwiching the signal conductor pattern have different impedances with respect to a ground line component (for example, a rear surface ground conductor of the relay substrate 1018).

In particular, as an example, in the relay substrate 1018, within the connection area defined for at least one signal conductor pattern, the respective portions, within the connection area, of the two adjacent ground conductor patterns sandwiching the signal conductor pattern have a difference in the presence or absence of vias (that is, the vias are provided only in one of the portions) so that the impedances are different from each other.

Specifically, the relay substrate 1018 has the same configuration as the relay substrate 118 of the first embodiment illustrated in FIG. 4, but has a difference that ground conductor patterns 1040*a*, 1040*b*, 1040*c*, 1040*d*, and 1040*e* are provided instead of the ground conductor patterns 340*a*, 340*b*, 340*c*, 340*d*, and 340*e*. In the relay substrate 1018 as well, the signal conductor patterns 330 and the ground conductor patterns 1040*a*, 1040*b*, 1040*c*, 1040*d*, and 1040*e* are formed so that characteristic impedances of the signal conductor patterns 330 are the same inside and outside the connection areas of 450*a*, 550*b*, 550*c*, and 450*d*.

Six vias 1062 are formed in each of the ground conductor patterns 1040*b* and 1040*d*. In FIG. 10, reference numeral 1062 is attached to only one of the six vias in each of the ground conductor patterns 1040*b* and 1040*d* in order to avoid redundant description. It should be understood that in each of the ground conductor patterns 1040*b* and 1040*d*, the other five circles drawn in the same size as the via 1062 to which the reference numeral is attached have the same manner as the via 1062.

Specifically, in the adjacent ground conductor patterns 1040*a* and 1040*b* sandwiching the signal conductor pattern 330*a*, only one ground conductor pattern 1040*b* is connected to the rear surface ground conductor by the two vias 1062, and such vias are not provided in the other ground conductor pattern 1040*a*, within the connection area 450*a* defined for the signal conductor pattern 330*a*.

Further, in the adjacent ground conductor patterns 1040*b* and 1040*c* sandwiching the signal conductor pattern 330*b*, only one ground conductor pattern 1040*b* is connected to the rear surface ground conductor by the two vias 1062, and such vias are not provided in the other ground conductor pattern 1040*c*, within the connection area 550*b* defined for the signal conductor pattern 330*b*.

In the same manner, in the adjacent ground conductor patterns 1040*c* and 1040*d* sandwiching the signal conductor pattern 330*c*, only one ground conductor pattern 1040*d* is connected to the rear surface ground conductor by the two vias 1062, and such vias are not provided in the other ground conductor pattern 1040*c*, within the connection area 550*c* defined for the signal conductor pattern 330*c*.

Further, in the adjacent ground conductor patterns 1040*d* and 1040*e* sandwiching the signal conductor pattern 330*d*, only one ground conductor pattern 1040*d* is connected to the rear surface ground conductor by the two vias 1062, and such vias are not provided in the other ground conductor pattern 1040*e*, within the connection area 450*d* defined for the signal conductor pattern 330*d*.

As described above in relation to the relay substrate 618 according to the second modification example, in general, in a high-frequency signal line including a signal conductor and a ground conductor, the smaller the impedance from the ground conductor to a ground line (that is, the more so-called ground strengthening is sufficient), the stronger confinement of the high-frequency signal in the signal conductor.

Therefore, in the relay substrate 1018, leaked microwaves generated in the connection area 450*a* and 550*b* have higher intensities in a direction of the ground conductor patterns 1040*a* and 1040*c* that are not connected to the rear surface ground conductor by the vias 1062, respectively (therefore, the impedance to the rear surface ground conductor is higher), and intensities in the other direction are reduced. Therefore, in the relay substrate 1018, in the same manner as in the relay substrate 118, crosstalk via the leaked microwaves is reduced between the signal conductor patterns 330*a* and 330*b* respectively propagating the two paired high-frequency electrical signals. In the same manner, leaked microwaves generated in the connection area 550*c* and 450d have higher intensities in a direction toward the ground conductor patterns 1040c and 1040e in which the via 1062 is not formed and an impedance to the rear surface ground conductor is higher, respectively, and intensities in the other direction are reduced. Therefore, in the relay substrate 1018, crosstalk via the leaked microwaves is reduced between the signal conductor patterns 330c and 330d respectively propagating the other two paired high-frequency electrical signals.

As a result, even in a case where the relay substrate 1018 is used, appropriate optical modulation characteristics can be realized as the optical modulator 100.

Seventh Modification Example

Figure 11:
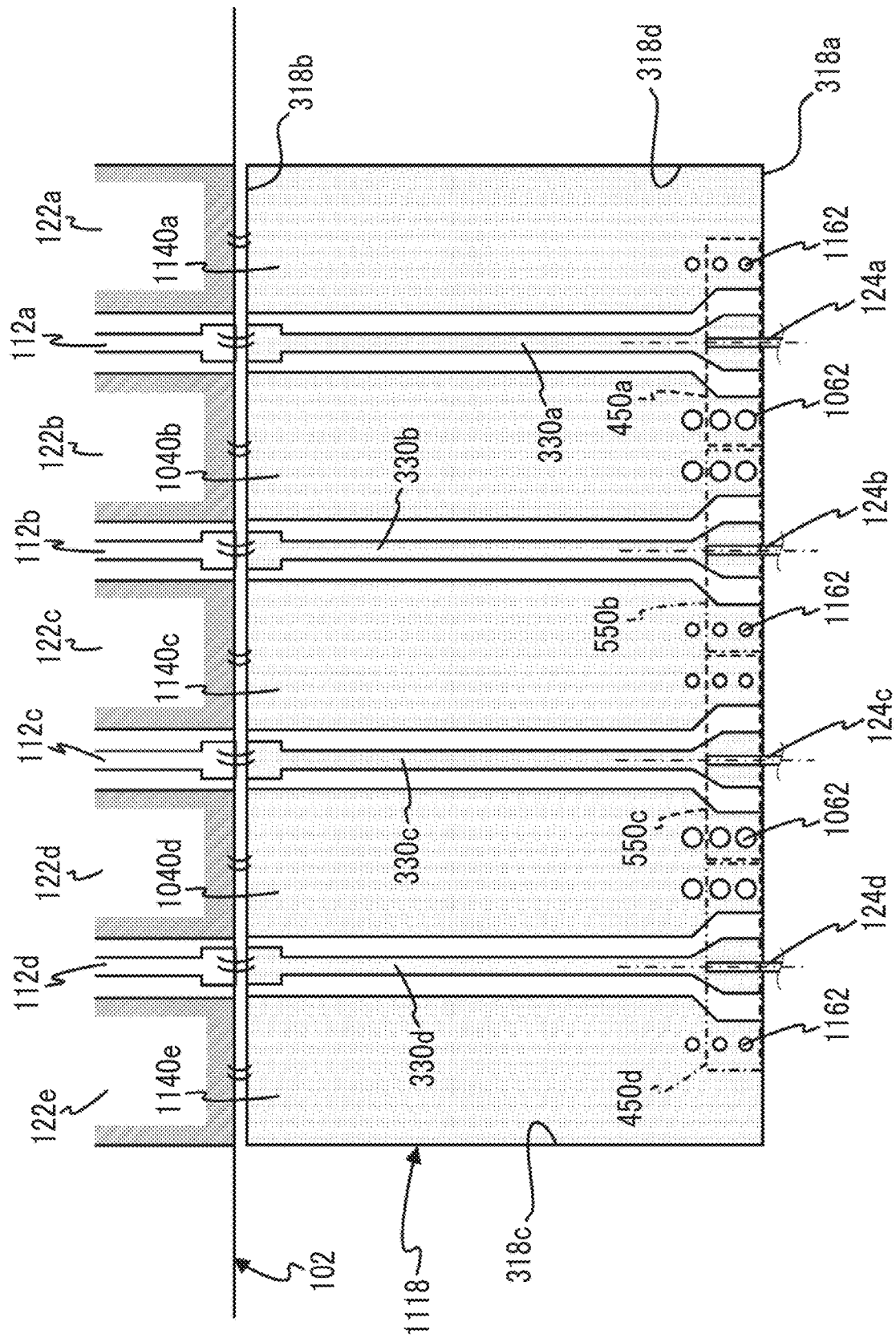
FIG. 11 is a diagram illustrating a configuration of a relay substrate according to a seventh modification example of the optical modulator according to the first embodiment.

FIG. 11 is a diagram illustrating a configuration of a relay substrate 1118 according to a seventh modification example, and is a diagram corresponding to the partial detail view of the first embodiment illustrated in FIG. 4. The relay substrate 1118 can be used instead of the relay substrate 118 in the optical modulator 100 illustrated in FIG. 1. In FIG. 11, the same reference numerals as those in FIGS. 4, 5, and 10 are used for the same components as those of the components of the relay substrates 118, 518, and 1080 illustrated in FIGS. 4, 5, and 10, and the above descriptions of FIGS. 4, 5, and 10 are adopted.

The relay substrate 1118 is formed with the signal conductor patterns 330 in the same manner as the relay substrates 118 and 518 of the first embodiment and the first modification example illustrated in FIGS. 4 and 5. Therefore, in the relay substrate 818, the connection areas 450a, 550b, 550c, and 450d are defined for each of the signal conductor patterns 330, in the same manner as the relay substrate 118.

In the same manner as the relay substrate 1018 in FIG. 10 of the sixth modification example described above, the relay substrate 1118 in the present modification example is formed so that within a connection area defined for at least one signal conductor pattern, respective portions, within the connection portion, of two adjacent ground conductor patterns sandwiching the signal conductor pattern have different impedances with respect to a ground line component (for example, a rear surface ground conductor of the relay substrate 1118).

However, unlike the relay substrate 1018, in the relay substrate 1118, diameters of vias provided in the respective portions of the two adjacent ground conductor patterns sandwiching at least one signal conductor pattern within the connection area defined for the signal conductor pattern are different from each other, so that the impedances are different from each other.

Specifically, the relay substrate 1118 is different from the relay substrate 1080 in that ground conductor patterns 1140a, 1140c, and 1140e are provided in place of the ground conductor patterns 1040a, 1040c, and 1040e. In the relay substrate 1118 as well, the signal conductor patterns 330 and the ground conductor patterns 1140a, 1040b, 1140c, 1040d, and 1140e are formed so that characteristic impedances of the signal conductor patterns 330 are the same inside and outside the connection areas of 450a, 550b, 550c, and 450d.

The ground conductor patterns 1140a, 1140c, and 1140e have the same configuration as the ground conductor patterns 1040a, 1040c, and 1040e, but have a difference that within the respective corresponding connection area 450a, 550b, 550c, 450d, the same number of vias 1162 as the vias 1062 having a diameter smaller than a diameter of the vias 1062 are provided. Here, in FIG. 11, the reference numeral 1162 is attached to only one of the vias in each of the ground conductor patterns 1140a, 1140c, and 1140e in order to avoid redundant description. It should be understood that in each of the ground conductor patterns 1140a, 1140c, and 1140e, the other two, five, and two circles drawn in the same size as the via 1162 to which the reference numeral is attached have the same manner as the via 1162.

Specifically, within the connection area 450a defined for the signal conductor pattern 330a, one ground conductor pattern 1140b sandwiching the signal conductor pattern 330a is connected to the rear surface ground conductor by the two vias 1062 and the other ground conductor pattern 1140a is connected to the rear surface ground conductor by the vias 1162 having the same number (that is, two in this example) and the diameter smaller than the diameter of the via 1062.

Further, within the connection area 550b defined for the signal conductor pattern 330b, one ground conductor pattern 1140b sandwiching the signal conductor pattern 330b is connected to the rear surface ground conductor by the two vias 1062 and the other ground conductor pattern 1140c is connected to the rear surface ground conductor by the vias 1162 having the same number and the diameter smaller than the diameter of the via 1062.

In the same manner, within the connection area 550c defined for the signal conductor pattern 330c, one ground conductor pattern 1040d sandwiching the signal conductor pattern 330c is connected to the rear surface ground conductor by the two vias 1062 and the other ground conductor pattern 1140c is connected to the rear surface ground conductor by the vias 1162 having the same number and the diameter smaller than the diameter of the via 1062.

Further, within the connection area 450d defined for the signal conductor pattern 330d, one ground conductor pattern 1040d sandwiching the signal conductor pattern 330d is connected to the rear surface ground conductor by the two vias 1062 and the other ground conductor pattern 1140e is connected to the rear surface ground conductor by the vias 1162 having the same number and the diameter smaller than the diameter of the via 1062.

Thus, in the relay substrate 1118, in the same manner as the relay substrate 1018 in FIG. 10 of the sixth modification example described above, leaked microwaves generated in the connection areas 450a and 550b respectively have higher intensities in a direction toward the ground conductor patterns 1040a and 1040c in which the vias 1162 having small diameters are provided and impedances with the rear surface ground conductor are higher, and intensities in the other direction are reduced. Therefore, in the relay substrate 1118, in the same manner as in the relay substrate 1018, crosstalk via the leaked microwaves is reduced between the signal conductor patterns 330a and 330b respectively propagating the two paired high-frequency electrical signals.

In the same manner, in the relay substrate 1118, leaked microwaves generated in the connection area 550c and 450d respectively have higher intensities in a direction to the ground conductor patterns 1140c and 1140e in which the vias 1162 having small diameters are provided and impedances with the rear surface ground conductor are higher, and intensities in the other direction are reduced. Therefore, in the relay substrate 1118, in the same manner as the relay substrate 1018 in FIG. 10 of the sixth modification example described above, crosstalk via the leaked microwaves is also reduced between the signal conductor patterns 330c and 330d respectively propagating the other two paired high-frequency electrical signals.

As a result, even in a case where the relay substrate 1118 is used, appropriate optical modulation characteristics can be realized as the optical modulator 100.

Eighth Modification Example

Figure 12:
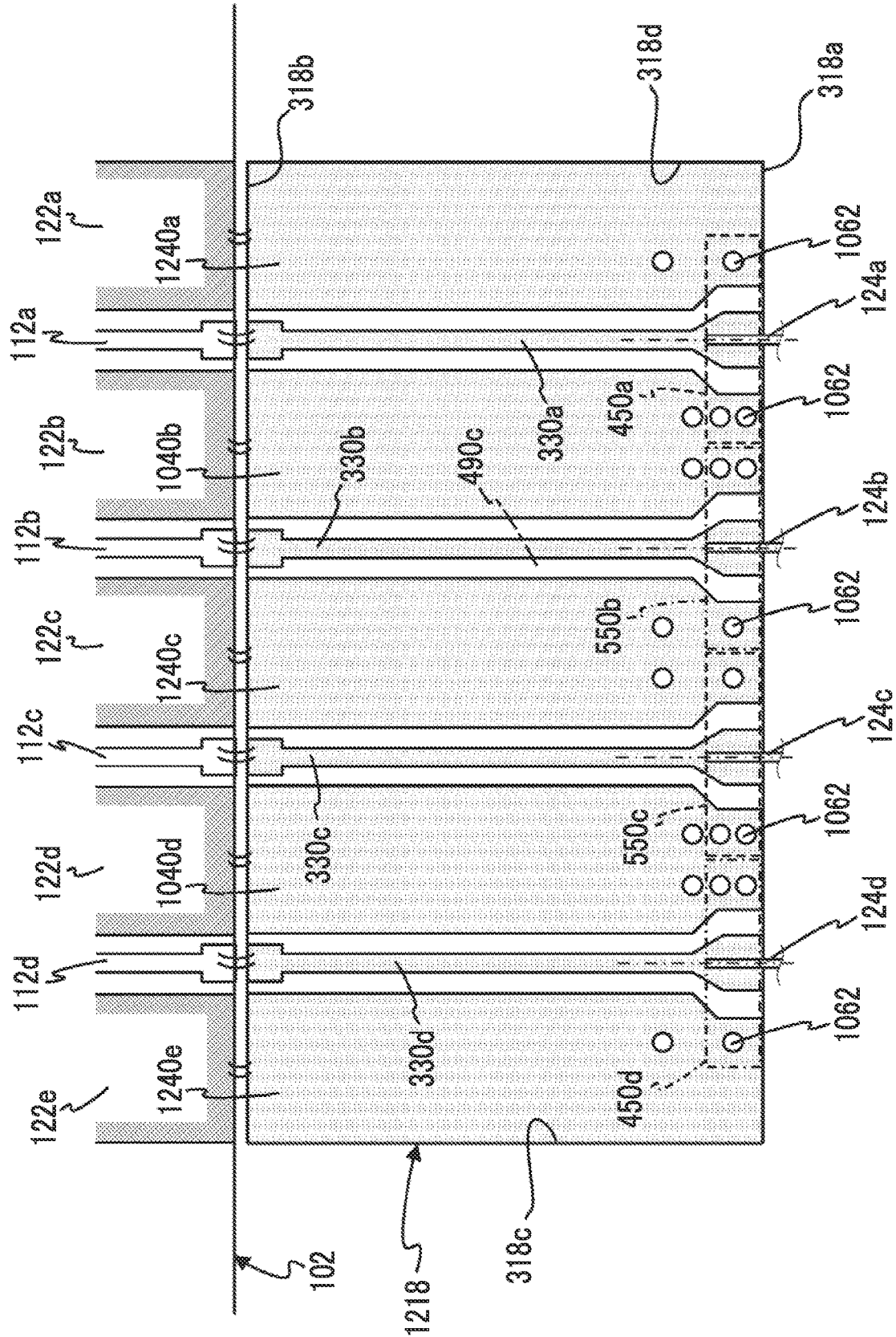
FIG. 12 is a diagram illustrating a configuration of a relay substrate according to an eighth modification example of the optical modulator according to the first embodiment.

FIG. 12 is a diagram illustrating a configuration of a relay substrate 1218 according to an eighth modification example, and is a diagram corresponding to the partial detail view of the first embodiment illustrated in FIG. 4. The relay substrate 1218 can be used instead of the relay substrate 118 in the optical modulator 100 illustrated in FIG. 1. In FIG. 12, the same reference numerals as those in FIGS. 4, 5, 10, and 11 are used for the same components as those of the components of the relay substrates 118, 518, 1018, and 1118 illustrated in FIGS. 4, 5, 10, and 11, and the above descriptions of FIGS. 4, 5, 10, and 11 are adopted.

The relay substrate 1218 is formed with the signal conductor patterns 330 in the same manner as the relay substrates 118 and 518 of the first embodiment and the first modification example illustrated in FIGS. 4 and 5. Therefore, in the relay substrate 1218, the connection areas 450*a*, 550*b*, 550*c*, and 450*d* are defined for each of the signal conductor patterns 330, in the same manner as the relay substrate 118.

In the same manner as the relay substrates 1018 and 1118 in the sixth modification example and the seventh modification example illustrated in FIGS. 10 and 11, the relay substrate 1218 is configured so that respective portions of two adjacent ground conductor patterns sandwiching at least one signal conductor pattern within a connection area defined for the signal conductor pattern are formed to have different impedances with respect to a ground line component (for example, the rear surface ground conductor of the relay substrate 1118).

However, unlike the relay substrates 1018 and 1118, in the relay substrate 1218, the numbers of vias provided in the respective portions of the two adjacent ground conductor patterns sandwiching at least one signal conductor pattern within the connection area defined for the signal conductor pattern are different from each other, so that the impedances are different from each other.

Specifically, the relay substrate 1218 is different from the relay substrate 1118 in that the ground conductor patterns 1240*a*, 1240*c*, and 1240*e* are provided in place of the ground conductor patterns 1140*a*, 1140*c*, and 1140*e*. In the relay substrate 1218 as well, the signal conductor patterns 330 and the ground conductor patterns 1240*a*, 1040*b*, 1240*c*, 1040*d*, and 1240*e* are formed so that characteristic impedances of the signal conductor patterns 330 are the same inside and outside the connection areas of 450*a*, 550*b*, 550*c*, and 450*d*.

Within the connection area 450*a* defined for the signal conductor pattern 330*a*, one ground conductor pattern 1140*b* sandwiching the signal conductor pattern 330*a* is connected to the rear surface ground conductor by the two vias 1062 and the other ground conductor pattern 1140*a* is connected to the rear surface ground conductor by a smaller number of vias 1062 (that is, one in this example).

Further, within the connection area 550*b* defined for the signal conductor pattern 330*b*, one ground conductor pattern 1140*b* sandwiching the signal conductor pattern 330*b* is connected to the rear surface ground conductor by the two vias 1062 and the other ground conductor pattern 1240*c* is connected to the rear surface ground conductor by a smaller number of vias 1062 (one in this example).

In the same manner, within the connection area 550*c* defined for the signal conductor pattern 330*c*, one ground conductor pattern 1040*d* sandwiching the signal conductor pattern 330*c* is connected to the rear surface ground conductor by the two vias 1062 and the other ground conductor pattern 1240*c* is connected to the rear surface ground conductor by a via 1062 which number is smaller than the number of the two vias 1062 on the ground conductor pattern 1040*d*.

Further, within the connection area 450*d* defined for the signal conductor pattern 330*d*, one ground conductor pattern 1040*d* sandwiching the signal conductor pattern 330*d* is connected to the rear surface ground conductor by the two vias 1062 and the other ground conductor pattern 1240*e* is connected to the rear surface ground conductor by the vias 1162 having a diameter smaller than diameters of a smaller number of vias 1062 a via 1062 which number is smaller than the number of the two vias 1062 on the ground conductor pattern 1040*d*.

Thus, in the relay substrate 1218, in the same manner as the relay substrate 1118 of the seventh modification example illustrated in FIG. 11 described above, leaked microwaves generated in the connection areas 450*a* and 550*b* respectively have higher intensities in a direction toward the ground conductor patterns 1040*a* and 1040*c* in which the smaller number of vias 1062 as compared with the ground conductor pattern 1040*b* are provided and impedances with the rear surface ground conductor are higher, and intensities in the other direction are reduced. Therefore, in the relay substrate 1218, in the same manner as in the relay substrate 1118, crosstalk via the leaked microwaves is reduced between the signal conductor patterns 330*a* and 330*b* respectively propagating the two paired high-frequency electrical signals.

In the same manner, in the relay substrate 1218, leaked microwaves generated in the connection area 550*c* and 450*d* respectively have higher intensities in a direction to the ground conductor patterns 1140*c* and 1140*e* in which the smaller number of vias 1062 as compared with the ground conductor pattern 1040*d* are provided and impedances with the rear surface ground conductor are higher, and intensities in the other direction are reduced. Therefore, in the relay substrate 1218, in the same manner as in the relay substrate 1118, crosstalk via the leaked microwaves is also reduced between the signal conductor patterns 330*c* and 330*d* respectively propagating the other two paired high-frequency electrical signals.

As a result, even in a case where the relay substrate 1218 is used, appropriate optical modulation characteristics can be realized as the optical modulator 100.

Ninth Modification Example

Each feature configuration within the connection area illustrated in each of the above-described modification examples can be combined and/or overlapped in one relay substrate. The present modification example illustrates examples of such a relay substrate.

Figure 13:
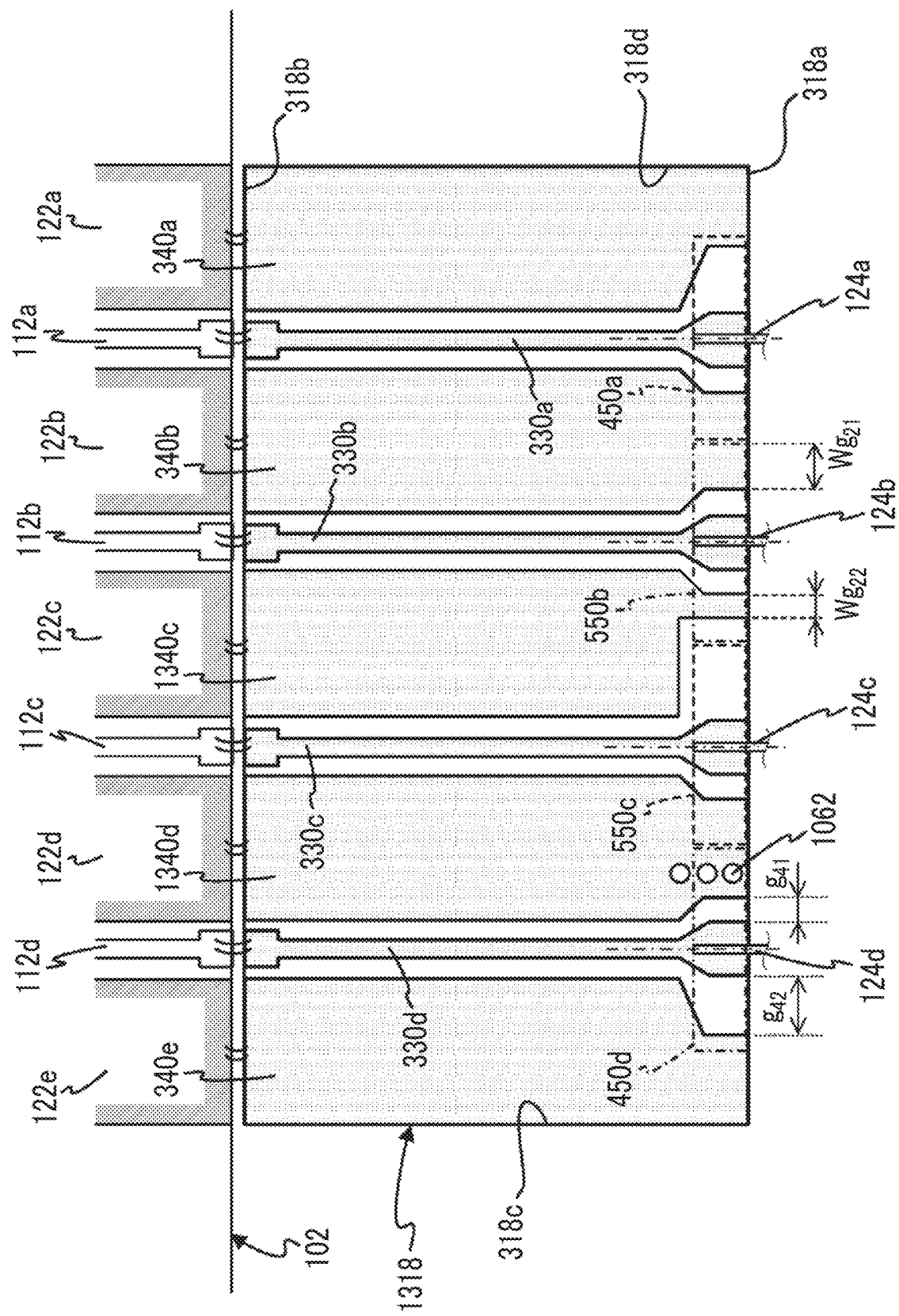
FIG. 13 is a diagram illustrating a configuration of a relay substrate according to a ninth modification example of the optical modulator according to the first embodiment.

FIG. 13 is a diagram illustrating a configuration of a relay substrate 1318 according to a ninth modification example, and is a diagram corresponding to the partial detail view of the first embodiment illustrated in FIG. 4. The relay substrate 1218 can be used instead of the relay substrate 118 in the optical modulator 100 illustrated in FIG. 1. In FIG. 12, the same reference numerals as those in FIGS. 4, 5, 6, 7, 8, 10 are used for the same components as those of the components of the relay substrates 118, 518, 618, 718, 818, and 1018 illustrated in FIGS. 4, 5, 6, 7, 8, 10, and the above descriptions of FIGS. 4, 5, 6, 7, 8, 10 are adopted.

The relay substrate 1318 is formed with the signal conductor patterns 330 in the same manner as the relay substrates 118 and 518 of the first embodiment and the first modification example illustrated in FIGS. 4 and 5. Therefore, in the relay substrate 1318, the connection areas 450*a*, 550*b*, 550*c*, and 450*d* are defined for each of the signal conductor patterns 330, in the same manner as the relay substrate 118.

In the relay substrate 1318 according to the ninth modification example, the feature configurations of the relay substrates 118, 618, and 718 the first embodiment, the second modification example, and the third modification example illustrated in FIGS. 4, 6, and 7 are respectively applied to the connection areas 450*a*, 550*b*, and 550*c* defined for the signal conductor patterns 330*a*, 330*b*, and 330*c*, and the feature configurations of the relay substrates 118 and 1018 of the first embodiment and the sixth modification example illustrated in FIGS. 4 and 10 are applied to the signal conductor pattern 330*d* in an overlapped manner.

The relay substrate 1318 has the same configuration as the relay substrate 118, but has a difference that ground conductor patterns 1340*c* and 1340*d* are provided instead of the ground conductor patterns 340*c* and 340*d*. In the relay substrate 1318 as well, the signal conductor patterns 330 and the ground conductor patterns 340*a*, 340*b*, 1340*c*, 1340*d*, and 340*e* are formed so that characteristic impedances of the signal conductor patterns 330 are the same inside and outside the connection areas of 450*a*, 550*b*, 550*c*, and 450*d*.

The relay substrate 1318 has the ground conductor patterns 340*a* and 340*b* in the same manner as the relay substrate 118. Thus, crosstalk via leaked microwaves generated from the connection area 450*a* toward the signal conductor patterns 330*a* to 330*b* is suppressed for the reason described above in relation to the relay substrate 118.

The ground conductor pattern 1340*c* has the same configuration as the ground conductor pattern 340*c*, but is configured so that the formation width Wg22 of a portion within the connection area 550*b* is narrower than the formation width Wg21 of a portion within the connection area 550*b* of the opposite ground conductor pattern 340*b* sandwiching the signal conductor pattern 330*b*, in the same manner as the relay substrate 618 of the second modification example illustrated in FIG. 6. Thus, crosstalk via leaked microwaves generated from the connection area 550*b* toward the signal conductor patterns 330*b* to 330*a* is suppressed for the reason described above in relation to the relay substrate 618.

Further, the ground conductor pattern 1340*c* does not include a pattern formed in the connection area 550*c* in the same manner as the relay substrate 718 of the third modification example illustrated in FIG. 7. The ground conductor pattern 1340*d* is formed in the same shape as the ground conductor pattern 340*d* within the connection area 450*d*. Therefore, crosstalk via leaked microwaves generated from the connection area 550*c* toward the signal conductor patterns 330*c* to 330*d* is suppressed for the reason described above in relation to the relay substrate 718.

Further, in the connection area 450*d* of the relay substrate 1318, in the same manner as in the relay substrate 118 of the first embodiment illustrated in FIG. 4, gaps (g41 and g42 in FIG. 13) between respective edges facing the signal conductor pattern 330*d* and edges of the signal conductor pattern 330*d* respectively facing the edges are different from each other, so that the ground conductor patterns 1340*d* and 340*e* sandwiching the signal conductor pattern 330*d* are formed in an asymmetrical shape with respect to the signal conductor pattern 330*d* in the connection area 450*d*. Further, in the connection area 450*d* of the relay substrate 1318, in the same manner as in the relay substrate 1018 of the sixth modification example illustrated in FIG. 10, only the ground conductor pattern 1340*d* is connected to the rear surface ground conductor by the two vias 1062, and such vias are not provided at the ground conductor pattern 340*e*. Therefore, in the relay substrate 1318, crosstalk via leaked microwaves generated from the connection area 450*d* toward the signal conductor patterns 330*d* to 330*c* is suppressed for the reason described above in relation to the relay substrates 518 and 1018 of the second modification example and the sixth modification example illustrated in FIGS. 5 and 10.

As a result, even in a case where the relay substrate 1318 is used, appropriate optical modulation characteristics can be realized as the optical modulator 100.

The method of combining and overlapping the feature configurations of the relay substrates 118, 518, 618, 718, 818, 918, 1018, 1118, and 1218 when constructing one relay substrate is not limited to the configuration of the relay substrate 1318 described above. These feature configurations can be combined and/or overlapped in any manner for the purpose of suppressing crosstalk via leaked microwaves and/or substrate leaked microwaves between adjacent signal conductor patterns, based on the above-described crosstalk suppression principle related to these relay substrates.

Second Embodiment

Next, a second embodiment of the present invention will be described. The present embodiment provides an optical transmission apparatus on which any optical modulator of the optical modulator 100 according to the first embodiment and the optical modulators 100 using the relay substrates 518, 618, 718, 818, 918, 1018, 1118, 1218, 1318 according to the modification examples is mounted.

Figure 14:
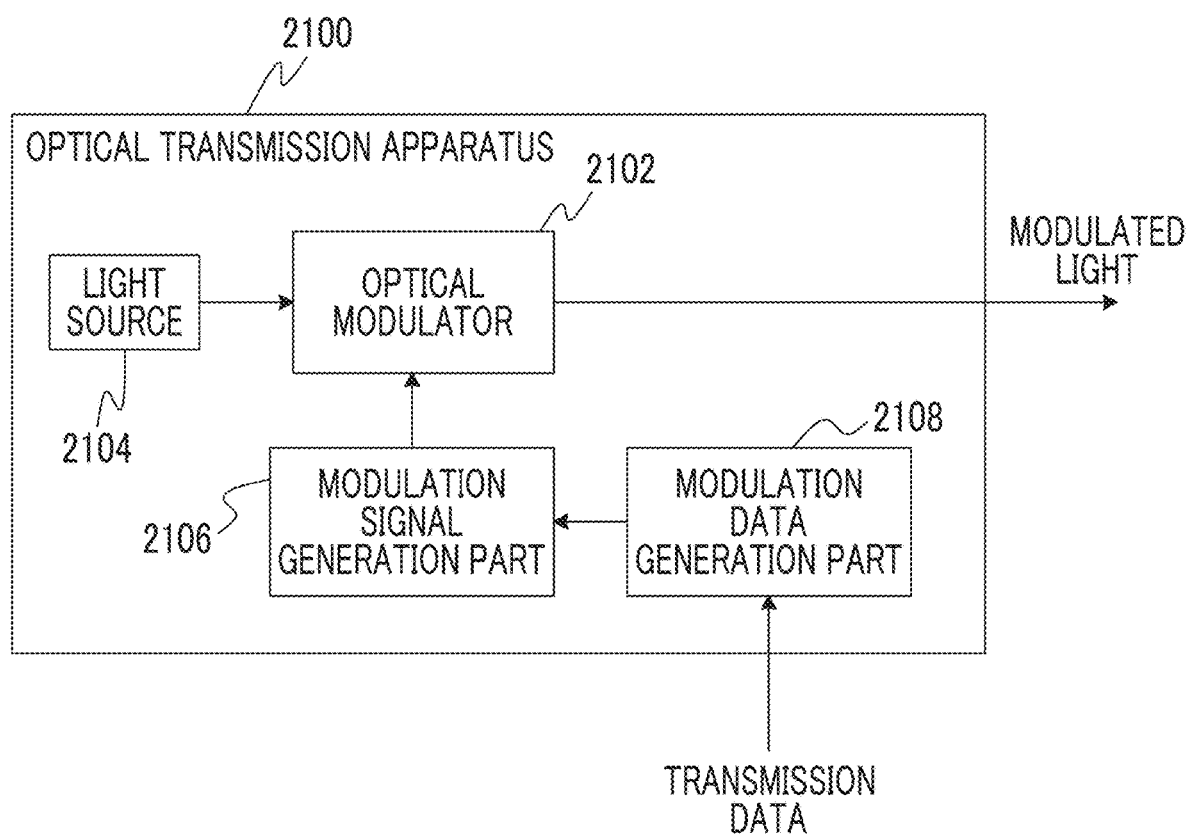
FIG. 14 is a diagram illustrating a configuration of an optical transmission apparatus according to a second embodiment of the present invention.
Figure 15:
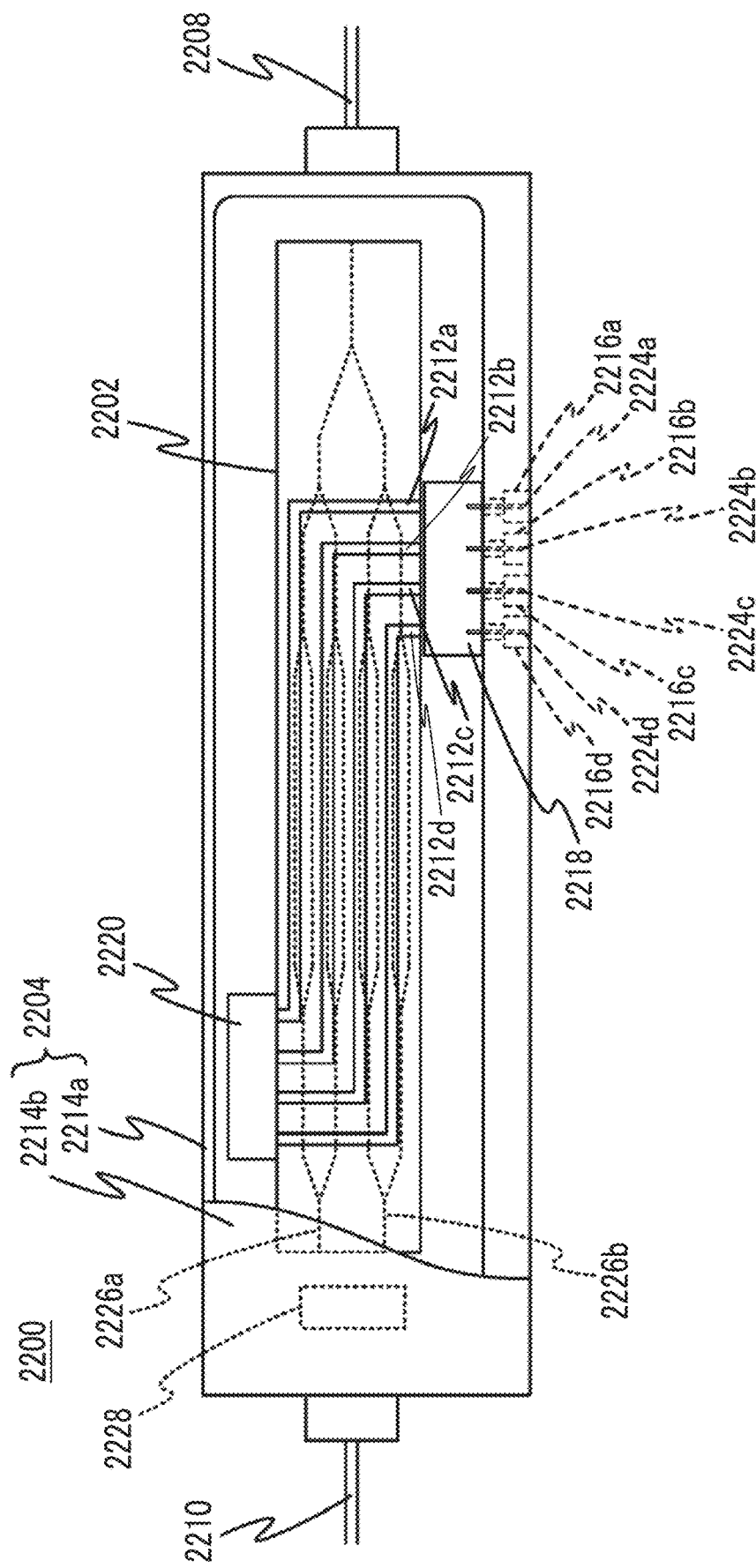
FIG. 15 illustrates an example of a configuration of an optical modulator in the related art.
Figure 16:
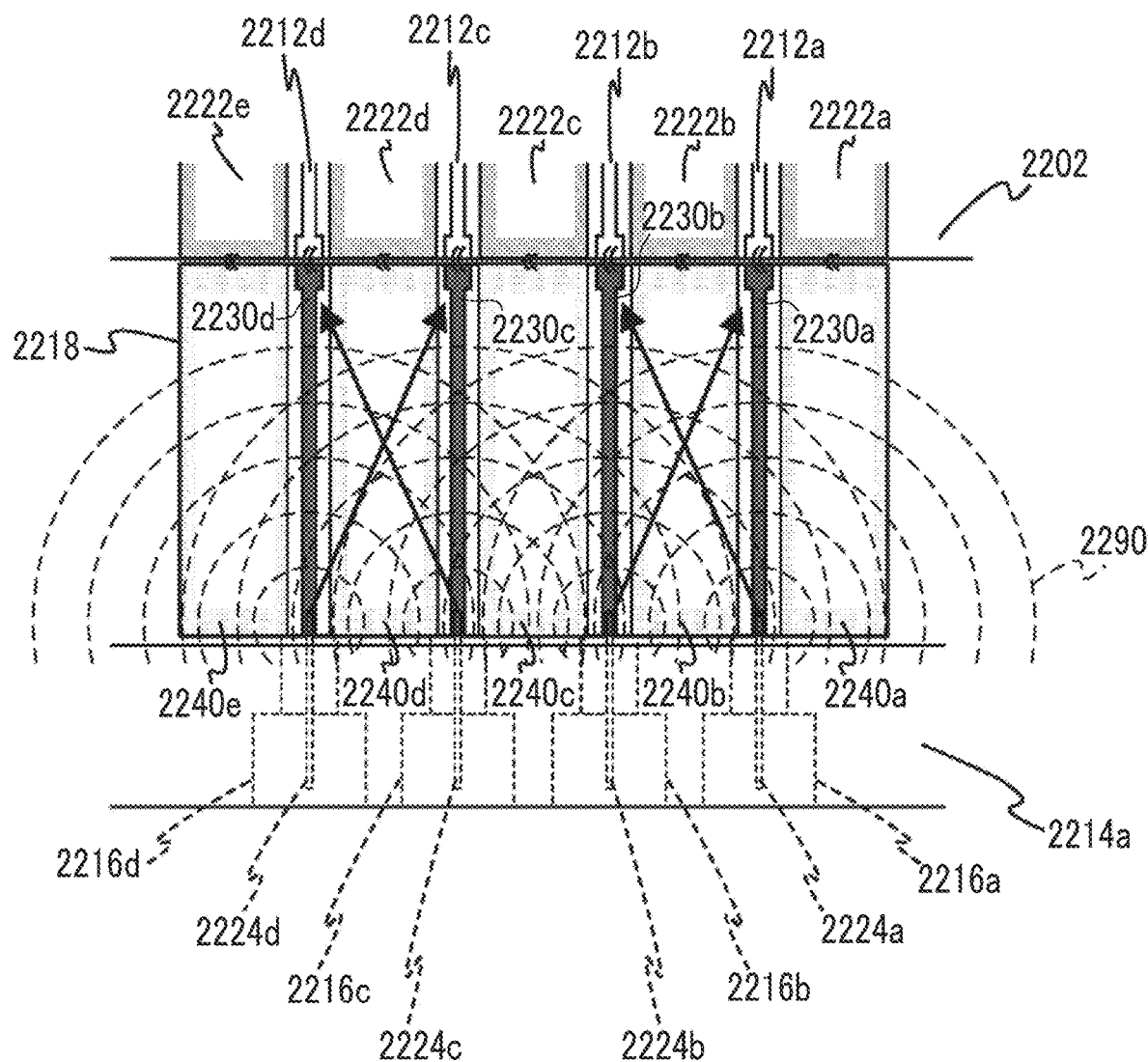
FIG. 16 is an explanatory diagram for explaining a generation of leaked microwaves in the optical modulator in the related art.

FIG. 14 is a diagram illustrating a configuration of an optical transmission apparatus according to the present embodiment. An optical transmission apparatus 2100 includes an optical modulator 2102, a light source 2104 that inputs light to the optical modulator 2102, a modulation signal generation part 2106, and a modulation data generation part 2108.

The optical modulator 2102 can be any optical modulator of the optical modulator 100 according to the first embodiment and the optical modulators 100 using the relay substrates 518, 618, 718, 818, 918, 1018, 1118, 1218, and 1318 according to the modification examples described above. Here, in order to avoid redundant description and facilitate understanding, the optical modulator 2102 is assumed to be the optical modulator 100 according to the first embodiment, hereinafter.

The modulation data generation part 2108 receives transmission data given from the outside, generates modulation data for transmitting the transmission data (for example, data obtained by converting or processing transmission data into a predetermined data format), and outputs the generated modulation data to the modulation signal generation part 2106.

The modulation signal generation part 2106 is an electronic circuit (drive circuit) that outputs an electrical signal for causing the optical modulator 2102 to perform a modulation operation, generates a modulation signal which is a high-frequency signal for making the optical modulator 2102 perform an optical modulation operation according to the modulation data, based on the modulation data which is output by the modulation data generation part 2108, and inputs the generated modulation signal to the optical modulator 2102. The modulation signal includes four high-frequency electrical signals corresponding to the four signal electrodes 112*a*, 112*b*, 112*c*, and 112*d* of the optical modulation element 102 provided in the optical modulator 2102. Here, the high-frequency electrical signals input to the signal electrodes 112*a* and 112*b* form a pair, and output light output from one output optical waveguide 126*a* of the optical modulation element 102 is modulated. Further, the high-frequency electrical signals input to the signal electrodes 112*c* and 112*d* form the other pair, and output light output from the other output optical waveguide 126*b* of the optical modulation element 102 is modulated.

The four high-frequency electrical signals are input from the input signal terminals 124*a*, 124*b*, 124*c*, and 124*d* of the respective electrical connectors 116*a*, 116*b*, 116*c*, and 116*d* of the optical modulator 2102 to the signal conductor patterns 330*a*, 330*b*, 330*c*, and 330*d* on the relay substrate 118, and are input to the signal electrodes 112*a*, 112*b*, 112*c*, and 112*d* of the optical modulation element 102 via the signal conductor pattern 330*a* or the like.

Thus, the light output from the light source 2104 is, for example, DP-QPSK modulated by the optical modulator 2102 and output as modulated light from the optical transmission apparatus 2100.

In particular, in the optical transmission apparatus 2100, as the optical modulator 2102, any optical modulator of the optical modulator 100 according to the first embodiment and the optical modulators 100 using the relay substrates 518, 618, 718, 818, 918, 1018, 1118, 1218, 1318 according to the modification examples is used. Therefore, in the optical transmission apparatus 2100, it is possible to effectively reduce an increase in crosstalk between the high-frequency electrical signals for driving the optical modulation element 102 due to the above-described space leaked microwaves, particularly, crosstalk via space leaked microwaves between the signal lines propagating the two paired high-frequency electrical signals. Therefore, in the optical transmission apparatus 2100, it is possible to ensure stable and appropriate optical modulation characteristics, and to realize stable and appropriate transmission characteristics.

The present invention is not limited to the configurations of the embodiments and the modification examples described above, and can be realized in various aspects without departing from the spirit thereof.

For example, the above-described relay substrates 118, 518, 618, 718, 818, 918, 1018, 1118, 1218, and 1318 are examples of a configuration in which regarding at least one signal conductor pattern 330, the two ground conductor patterns sandwiching the signal conductor pattern are asymmetrically formed in the connection area, and the present invention is not limited to these. As long as the two ground conductor patterns sandwiching the signal conductor pattern are asymmetrically formed in the corresponding connection area, the two ground conductor patterns can be formed in any shape and/or any number of vias can be arranged in any position.

In this case, in a case where at least one signal conductor pattern 330 and the adjacent signal conductor pattern 330 respectively propagate two paired high-frequency signals, the two ground conductor patterns sandwiching the at least one signal conductor pattern 330 are desirable to be formed to reduce intensities of leaked microwaves generated from the corresponding connection area in a direction toward the adjacent signal conductor pattern 330. Specifically, among the two ground conductor patterns sandwiching the at least one signal conductor pattern 330, an impedance of the ground conductor pattern on a side farther from the adjacent signal conductor pattern 330 with respect to the ground line component can be increased. Alternatively, a distance between the at least one signal conductor pattern and the far-side ground conductor pattern can be increased to reduce a confinement intensity of the far-side high-frequency signal. A more specific configuration for increasing the impedance and decreasing the confinement intensity is clear from the feature configurations of the relay substrates 118, 518, 618, 718, 818, 918, 1018, 1118, 1218, and 1318 described above.

Further, in the relay substrates 118, 518, 618, 718, 818, 918, 1018, 1118, 1218, and 1318 described above, the signal conductor pattern 330 is configured so that characteristic impedances of the signal conductor pattern 330 are not changed inside and outside the connection area 450*a* and the like, but the present invention is not limited to this. The signal conductor pattern 330 may be configured so that the characteristic impedances of the signal conductor pattern 330 are changed inside and outside the connection area 450*a* and the like. Even in this configuration, if the two adjacent ground conductor patterns sandwiching the signal conductor pattern are formed asymmetrically in the corresponding connection area, it is possible to reduce propagation intensities of leaked microwaves generated from the connection area in a specific direction, as compared with a case where these ground conductor patterns are formed symmetrically.

Further, in the above-described relay substrates 118, 518, 618, 718, 818, 918, 1018, 1118, 1218, and 1318, one ground conductor pattern is formed between two adjacent signal conductor patterns 330, but the present invention is not limited to this. The ground conductor pattern sandwiched between the two adjacent signal conductor patterns 330 may be divided into two and formed. For example, the ground conductor pattern 540*c* sandwiched between the signal conductor patterns 330*b* and 330*c* in FIG. 5 may be formed as, for example, two ground conductor patterns divided between the connection areas 550*b* and 550*c*.

Further, in the relay substrates 418 and 518 according to the fourth and fifth modification examples illustrated in FIGS. 8 and 9, the two notched portions are provided in one ground conductor pattern (for example, the two notched portions 860*a* and 860*b* in the ground conductor pattern 840*b*), but the present invention is not limited to this. For example, the notched portions 860*a* and 860*b* may be formed as one notch that covers a range of the notched portions 860*a* and 860*b* by removing a part of the relay substrate 818 between the notched portions 860*a* and 860*b*.

Further, for example, in the above-described relay substrates 118, 518, 618, 718, 818, 918, 1018, 1118, 1218, and 1318, the signal conductor pattern 330 is illustrated to have a straight line shape from the signal input side 318*a* toward the signal output side 318*b*, but the present invention is not limited to this. In the same manner as the related art, the signal conductor pattern 330 can include different shapes, for example, each including a curved portion or a portion having a different width.

Further, in the above-described embodiment, for at least two signal conductor patterns 330, the two ground conductor patterns sandwiching each signal conductor pattern 330 are formed in an asymmetrical shape with respect to the corresponding signal conductor pattern in a portion within the corresponding connection area, or the impedances with respect to the ground line component is set to be different from each other, but the present invention is not limited to this.

In a case where it is sufficient to reduce only leaked microwaves generated from one specific signal conductor pattern, due to respective shapes of the signal conductor patterns 330 formed on the relay substrate 118 and the like, characteristics of the optical modulation element 102, or the like, regarding only the specific signal conductor pattern, a portion within the corresponding connection area is formed in an asymmetrically with respect to the corresponding signal conductor pattern, or impedances to the ground line component is different from each other.

Further, in the relay substrates 1018, 1118, and 1218 according to the sixth modification example, the seventh modification example, and the eighth modification example described above, the ground conductor patterns sandwiching the signal conductor pattern is configured so that the number of vias or the diameters of the vias provided at a portion within the corresponding connection area are different from each other and the impedances of the portion with respect to the ground line component are different from each other, but the present invention is not limited to this.

As long as the ground conductor patterns sandwiching the signal conductor pattern are provided so that the impedances of the portion within the corresponding connection area with respect to the ground line component are different from each other, the vias can be provided in any different manner. For example, the ground conductor patterns sandwiching the signal conductor pattern may be configured so that densities of the vias provided in the corresponding connection area are different from each other. Here, the density of vias can be represented by the number of vias provided per unit area or an area of the vias provided per unit area. This is because the larger the number of vias or the area of the vias, the lower the impedance with the rear surface ground conductor which is the ground line component.

Further, in the above-described embodiment, the optical modulation element 102 is a DP-QPSK modulator configured by using an LN substrate, but the present invention is not limited to this. For example, the optical modulation element 102 may be any optical modulation element configured by using a semiconductor substrate.

As described above, the optical modulator 100 according to the above-described embodiment includes the optical modulation element 102 including a plurality of signal electrodes 112, and a plurality of input signal terminals 124a for inputting electrical signals to be respectively applied to the signal electrode 112. Further, the optical modulator 100 includes the relay substrate 518 on which a plurality of signal conductor patterns 330 that electrically connect the input signal terminal 124 and the signal electrode 112, a plurality of ground conductor patterns 340, and the like are formed, and the housing 104 that accommodates the optical modulation element 102 and the relay substrate 118. Then, in the optical modulator 100, for example, as illustrated in the description of the relay substrates 118 and 518 as examples, for at least one signal conductor pattern, for example, the signal conductor pattern 330b, the two ground conductor patterns 340b and 540c sandwiching the signal conductor pattern 330b on the relay substrate 518 are formed in an asymmetrical shape in a plan view with respect to the signal conductor pattern 330b in the connection area 550b including a signal connection portion at which the signal conductor pattern 330b and the input signal terminal 124b are connected. Here, the connection area 550b is a rectangular range in the plan view, having the width w22 equal to a distance to the nearest adjacent signal conductor pattern (for example, the distance p1 to the signal conductor pattern 330a) by being centered on the signal conductor pattern 330b, which is the at least one signal conductor pattern and having the height d22 equal to a distance from the signal input side 318a on which the at least one signal conductor pattern 330b is connected to the input signal terminal 124b to a far end of the signal connection portion among sides of the relay substrate 518.

With this configuration, for example, a propagation direction of space leaked microwaves generated from the connection area 550b and propagating in a space is biased and crosstalk from the signal conductor pattern 330b to at least one adjacent signal conductor pattern (for example, signal conductor pattern 330a) is suppressed, so that it is possible to realize appropriate optical modulation characteristics.

Further, as illustrated in the relay substrates 118 and 518 as an example, in the optical modulator 100, for example, the two ground conductor patterns 340a and 340b sandwiching the signal conductor pattern 330a may be configured so that the distances g11 and g12 from the respective edges facing the signal conductor pattern 330a to the opposite edges of the signal conductor pattern 330a are different from each other in the connection area 450a.

With this configuration, without increasing a size of the relay substrate 118 or the like, for example, a propagation direction of space leaked microwaves generated from the connection area 450a and propagating in a space is biased to suppress crosstalk from the signal conductor pattern 330a to the adjacent signal conductor pattern 330b, so that it is possible to realize appropriate optical modulation characteristics.

Further, as illustrated in the relay substrate 618 as an example, in the optical modulator 100, for example, the two ground conductor patterns 640a and 340b sandwiching the signal conductor pattern 330a may be configured so that the widths Wg11 and Wg12 of the portions formed in the connection area 450a, measured in a direction orthogonal to an extending direction of the signal conductor pattern 330a are different from each other.

With this configuration, without increasing a size of the relay substrate 618, for example, a propagation direction of space leaked microwaves generated from the connection area 450a and propagating in a space is biased to suppress crosstalk from the signal conductor pattern 330a to the adjacent signal conductor pattern 330b, so that it is possible to realize appropriate optical modulation characteristics.

Further, as illustrated in the relay substrate 718 as an example, in the optical modulator 100, for example, one of the two ground conductor patterns 740a and 340b sandwiching the signal conductor pattern 330a, for example, the ground conductor pattern 740a may not include a portion formed within the connection area 450a.

With this configuration, without increasing a size of the relay substrate 718, for example, a propagation direction of space leaked microwaves generated from the connection area 450a and propagating in a space is biased to suppress crosstalk from the signal conductor pattern 330a to the adjacent signal conductor pattern 330b, so that it is possible to realize appropriate optical modulation characteristics.

Further, as illustrated by an example in the relay substrate 818 as an example, for example, the optical modulator 100 may have a configuration in which the notched portion 860a extending from the signal input side 318a and penetrating the relay substrate 818 in the thickness direction is provided at a portion of the connection area 450a at which one of the two ground conductor patterns 840a and 840b sandwiching the signal conductor pattern 330a is formed.

With this configuration, for example, the propagation of substrate leaked microwaves generated from the connection area 450a and propagating in the relay substrate 818 is blocked, and crosstalk from the signal conductor pattern 330a toward the adjacent signal conductor pattern 330b is suppressed, so that it is possible to realize appropriate optical modulation characteristics.

Further, as illustrated in the relay substrates 1018, 1118, 1218 and the like as an example, for example, the optical modulator 100 may have a configuration in which in a portion of the ground conductor patterns 1040a, 1040b, and the like sandwiching the signal conductor pattern 330a within the connection area 450a, the presence or absence of vias connected to the rear surface ground conductor provided on the rear surface of the relay substrate 1018 or the like, or the number or a density of vias are different from each other.

With this configuration, a characteristic impedance of the signal conductor pattern 300 hardly changes by providing the vias in the ground conductor pattern 1040 or the like sandwiching the signal conductor pattern 300, so that pattern design of the ground conductor pattern 1040 in the connection area 450a or the like becomes easy. That is, appropriate optical modulation characteristics can be realized by suppressing crosstalk via space leaked microwaves between the adjacent signal conductor patterns 330 without complicating the design.

Further, the optical modulator 100 can use, for example, the optical modulation element 102 that performs DP-QPSK modulation, which is configured to generate two modulated light beams, each of which is modulated by a pair of electrical signals, and the relay substrate 118 and the like may be configured to propagate the pair of electrical signals by a pair of signal conductor patterns adjacent to each other, for example, the signal conductor patterns 330a and 330b.

With this configuration, crosstalk propagated by the adjacent signal conductor patterns 300 between the two paired high-frequency electrical signals can be effectively reduced, so that it is possible to realize appropriate optical modulation characteristics.

Further, the optical transmission apparatus according to the second embodiment described above includes the modulation operation on the optical modulator 100 using any of the relay substrates described in the first embodiment or the modification examples thereof, the modulation signal generation part 2106 which is an electronic circuit that outputs an electrical signal for causing the optical modulator 100 to perform a modulation operation, and the like. With this configuration, for example, the propagation of leaked microwaves, which becomes noticeable as the transmission rate is increased, is suppressed and crosstalk and the like between a plurality of high-frequency electrical signals that drive the optical modulation element 102 is effectively reduced, so it is possible to realize stable and appropriate transmission characteristics.

REFERENCE SIGNS LIST 100, 2102, 2200 . . . optical modulator
102, 2202 . . . optical modulation element
104, 1604, 2204 . . . housing
108, 2208 . . . input optical fiber
110, 2210 . . . output optical fiber
112, 112a, 112b, 112c, 112d, 2212, 2212a, 2212b, 2212c, 2212d . . . signal electrode
114a, 2214a . . . case
114b, 2214b . . . cover
116, 116a, 116b, 116c, 116d, 2216, 2216a, 2216b, 2216c, 2216d . . . electrical connector
118, 518, 618, 718, 818, 918, 1018, 1118, 1218, 1318, 2218 . . . relay substrate
120, 2220 . . . terminator
122, 122a, 122b, 122c, 122d, 122e, 2222a, 2222b, 2222c, 2222d, 2222e . . . ground electrode
124, 124a, 124b, 124c, 124d, 2224, 2224a, 2224b, 2224c, 2224d . . . input signal terminal
126a, 126b . . . output optical waveguide
318a . . . signal input side
318b . . . signal output side
318c, 318d . . . side edge
326 . . . conductor wire
330, 330a, 330b, 330c, and 330d, 2230, 2230a, 2230b, 2230c, 2230d . . . signal conductor pattern
340, 340a, 340b, 340c, 340d, and 340e, 540c, 640a, 640c, 640e, 740a, 740c, 740e, 840a, 840b, 840c, 840d, 840e, 1040a, 1040b, 1040c, 1040d, 1040e, 1140a, 1140c, 1140e, 1240a, 1240c, 1240e, 1340c, 1340d, 2240a, 2240b, 2240c, 2240d, 2240e . . . ground conductor pattern
450a, 550b, 550c, 450d . . . connection area
860a, 860b, 860c, 860d . . . notched portion
1062, 1162 . . . via 2100 . . . optical transmission apparatus
2104 . . . light source
2106 . . . modulation signal generation part
2108 . . . modulation data generation part
2290 . . . spherical wave

The invention claimed is:

1. An optical modulator comprising:
an optical modulation element that includes a plurality of signal electrodes;
a plurality of input signal terminals each of which inputs an electrical signal to be applied to each of the signal electrodes;
a relay substrate on which a plurality of signal conductor patterns that electrically connect the input signal terminals to the signal electrodes, and a plurality of ground conductor patterns are formed; and
a housing that accommodates the optical modulation element and the relay substrate,
wherein
in a plan view of the relay substrate, each of the plurality of signal conductor patterns is in a straight line shape from one end to another end of the corresponding signal conductor pattern, the input signal terminals are linearly connected to the signal conductor patterns on extension lines of the signal conductor patterns, respectively, and in vicinity of a signal input side of the relay substrate, and on the relay substrate, each of the signal conductor patterns and each of the input signal terminals are sandwiched between two of the ground conductor patterns, and
in a plan view of the relay substrate, the two ground conductor patterns are formed in an asymmetrical shape with respect to the sandwiched signal conductor pattern in a connection area that is a rectangular area in the plan view, wherein the connection area is in a predetermined range including a signal connection portion at which the signal conductor patterns and the input signal terminals are connected, a part of the signal input side is set as one side in a width direction that is a direction orthogonal to an extending direction of the signal conductor patterns, at the connection area the sandwiched signal conductor pattern is set as a center in the width direction, the connection area has a width equal to a distance from the sandwiched signal conductor pattern to a nearest adjacent signal conductor pattern, and the connection area extends from the input signal side to an end, of the signal connection portion, farthest from the input signal side.

2. The optical modulator according to claim 1,
wherein the two ground conductor patterns are formed to have portions in which distances from respective edges of the two ground conductor patterns to opposite edges of the sandwiched signal conductor pattern are different from each other in the connection area.

3. The optical modulator according to claim 1,
wherein widths of portions formed in the connection area of the two ground conductor patterns, measured in the direction orthogonal to an extending direction of the sandwiched signal conductor pattern are different from each other.

4. The optical modulator according to claim 1,
wherein one of the two ground conductor patterns does not include a portion formed in the connection area.

5. The optical modulator according to claim 1,
wherein the relay substrate is provided with a notched portion extending from the signal input side and penetrating the relay substrate in a thickness direction at a portion of the connection area at which one of the two ground conductor patterns is formed.

6. The optical modulator according to claim 1,
wherein the optical modulation element is configured to generate two modulated light beams, each of which is modulated by a pair of the electrical signals, and
the relay substrate is configured to propagate the pair of electrical signals by a pair of the signal conductor patterns adjacent to each other.

7. An optical transmission apparatus comprising:
the optical modulator according to claim 1; and
an electronic circuit that outputs an electrical signal for causing the optical modulator to perform a modulation operation.

8. An optical modulator comprising:
an optical modulation element that includes a plurality of signal electrodes;
a plurality of input signal terminals each of which inputs an electrical signal to be applied to each of the signal electrodes;
a relay substrate on which a plurality of signal conductor patterns that electrically connect the input signal terminals to the signal electrodes, and a plurality of ground conductor patterns are formed; and
a housing that accommodates the optical modulation element and the relay substrate,
wherein
in a plan view of the relay substrate, each of the plurality of signal conductor patterns is in a straight line shape from a one end to an another end of the corresponding signal conductor pattern, the input signal terminals are linearly connected to the signal conductor patterns on extension lines of the signal conductor patterns, respectively, and in vicinity of a signal input side of the relay substrate, and on the relay substrate, each of the signal conductor patterns and each of the input signal terminals are sandwiched between two of the ground conductor patterns,
on the relay substrate, a rear surface ground conductor is formed on a surface facing a surface on which the ground conductor pattern is formed, and
in a plan view of the relay substrate, the two ground conductor patterns are formed in an asymmetrical shape in a connection area by setting a presence or absence of vias connecting the ground conductor patterns to the rear surface ground conductor, or the numbers of or diameters of formed vias to be different from each other, the connection area is a rectangular area in the plan view, wherein the connection area is in a predetermined range including a signal connection portion at which the signal conductor patterns and the input signal terminals are connected, a part of the signal input side is set as one side in a width direction that is a direction orthogonal to an extending direction of the signal conductor patterns, at the connection area the sandwiched signal conductor pattern is set as a center in the width direction, the connection area has a width equal to a distance from the sandwiched signal conductor pattern to a nearest adjacent signal conductor pattern, and the connection area extends from the input signal side to an end, of the signal connection portion, farthest from the input signal side.

9. The optical modulator according to claim 8,
wherein the optical modulation element is configured to generate two modulated light beams, each of which is modulated by a pair of the electrical signals, and
the relay substrate is configured to propagate the pair of electrical signals by a pair of the signal conductor patterns adjacent to each other.

10. An optical transmission apparatus comprising:
the optical modulator according to claim 8; and
an electronic circuit that outputs an electrical signal for causing the optical modulator to perform a modulation operation.

* * * * *